INVENTOR
ELMER A. GERDEMANN
BY
HIS ATTORNEYS

INVENTOR
ELMER A. GERDEMANN
BY Karl Berst
Albert L Sessler Jr
HIS ATTORNEYS

July 28, 1959   E. A. GERDEMANN   2,896,713
RECORDING DEVICES
Filed Dec. 2, 1955   10 Sheets-Sheet 3

INVENTOR
ELMER A. GERDEMANN
BY Carl Beust
Albert L. Sessler Jr.
HIS ATTORNEYS

July 28, 1959 E. A. GERDEMANN 2,896,713
RECORDING DEVICES
Filed Dec. 2, 1955 10 Sheets-Sheet 4

INVENTOR
ELMER A. GERDEMANN
BY
HIS ATTORNEYS

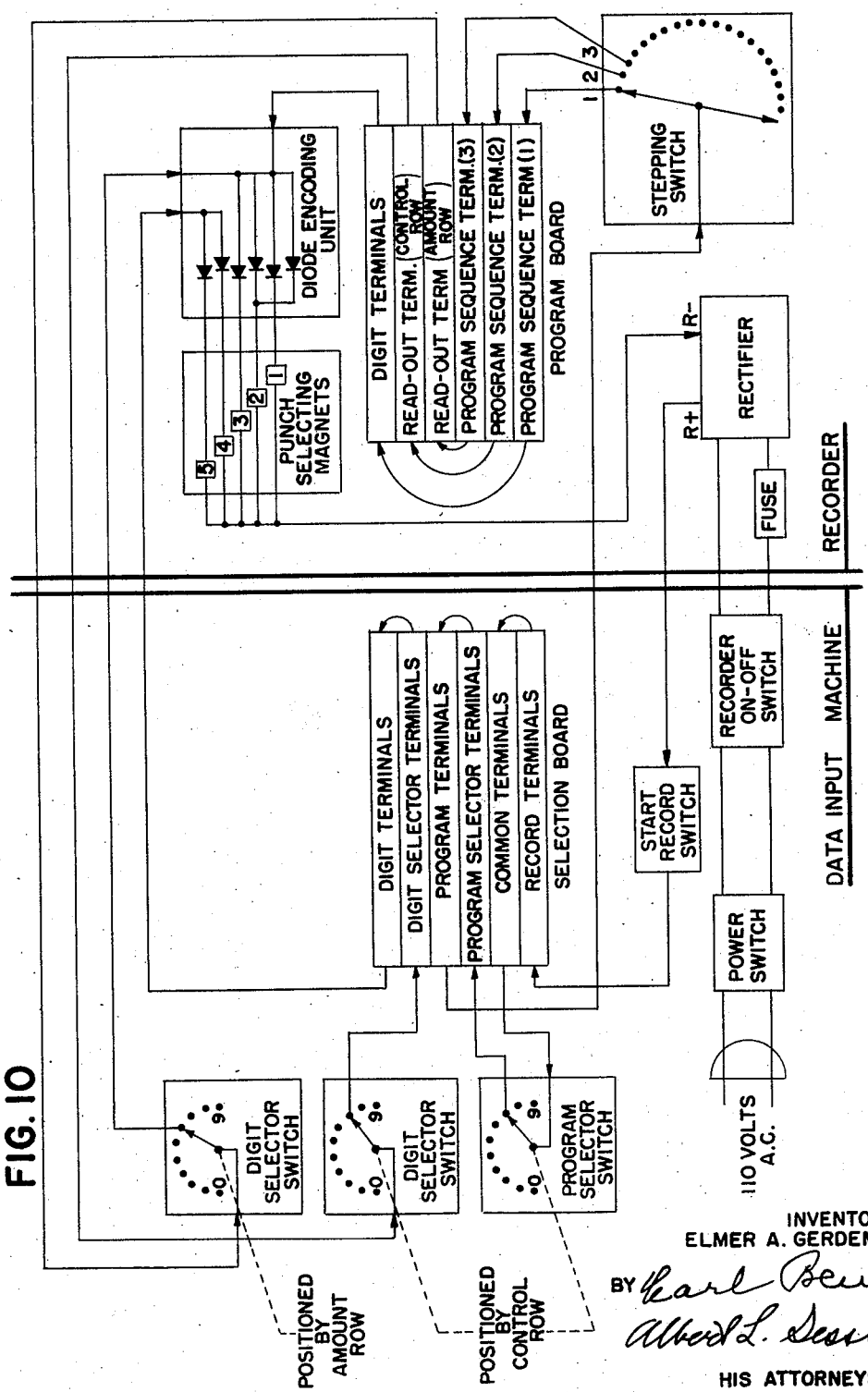

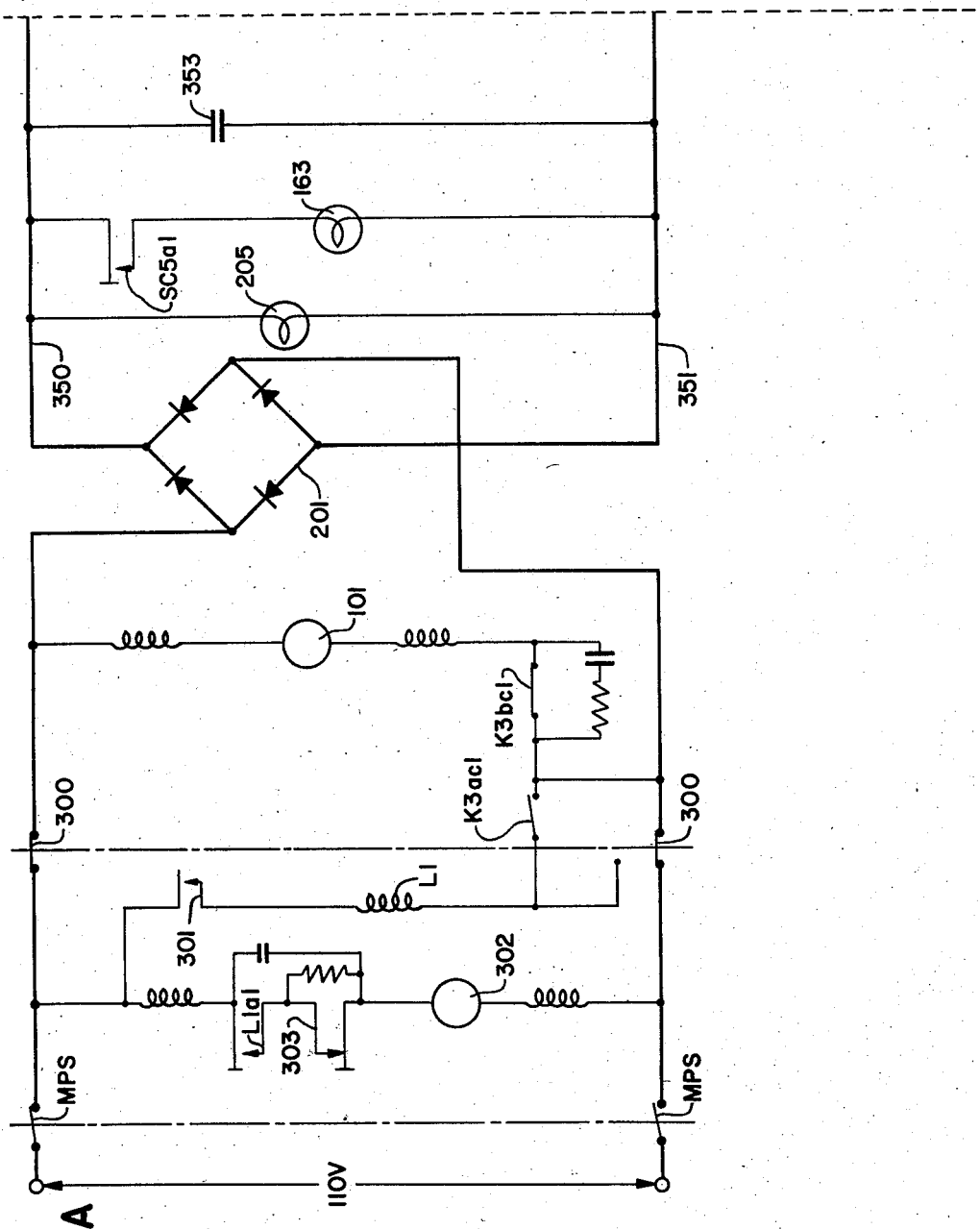

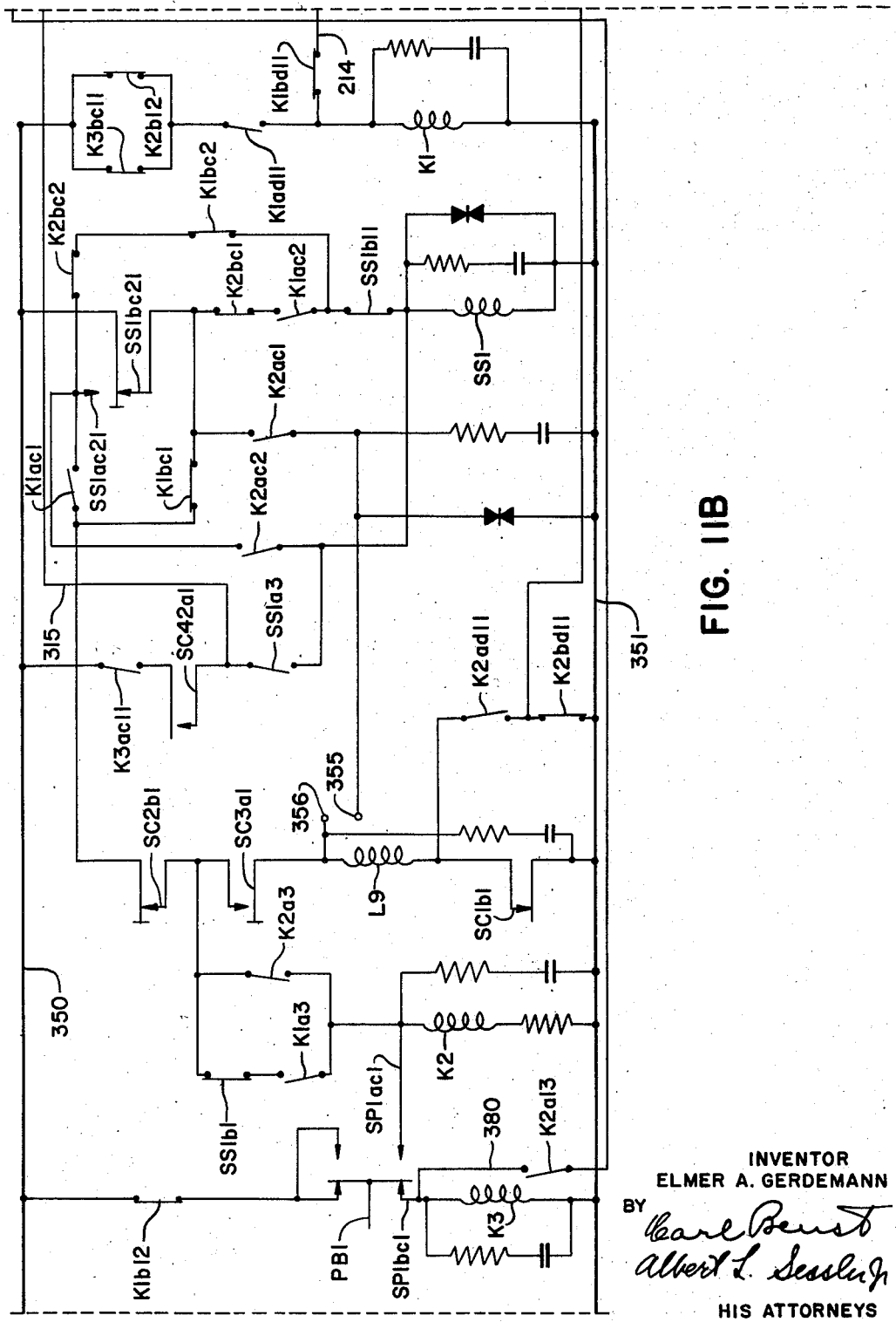
FIG. IIB
INVENTOR
ELMER A. GERDEMANN
HIS ATTORNEYS

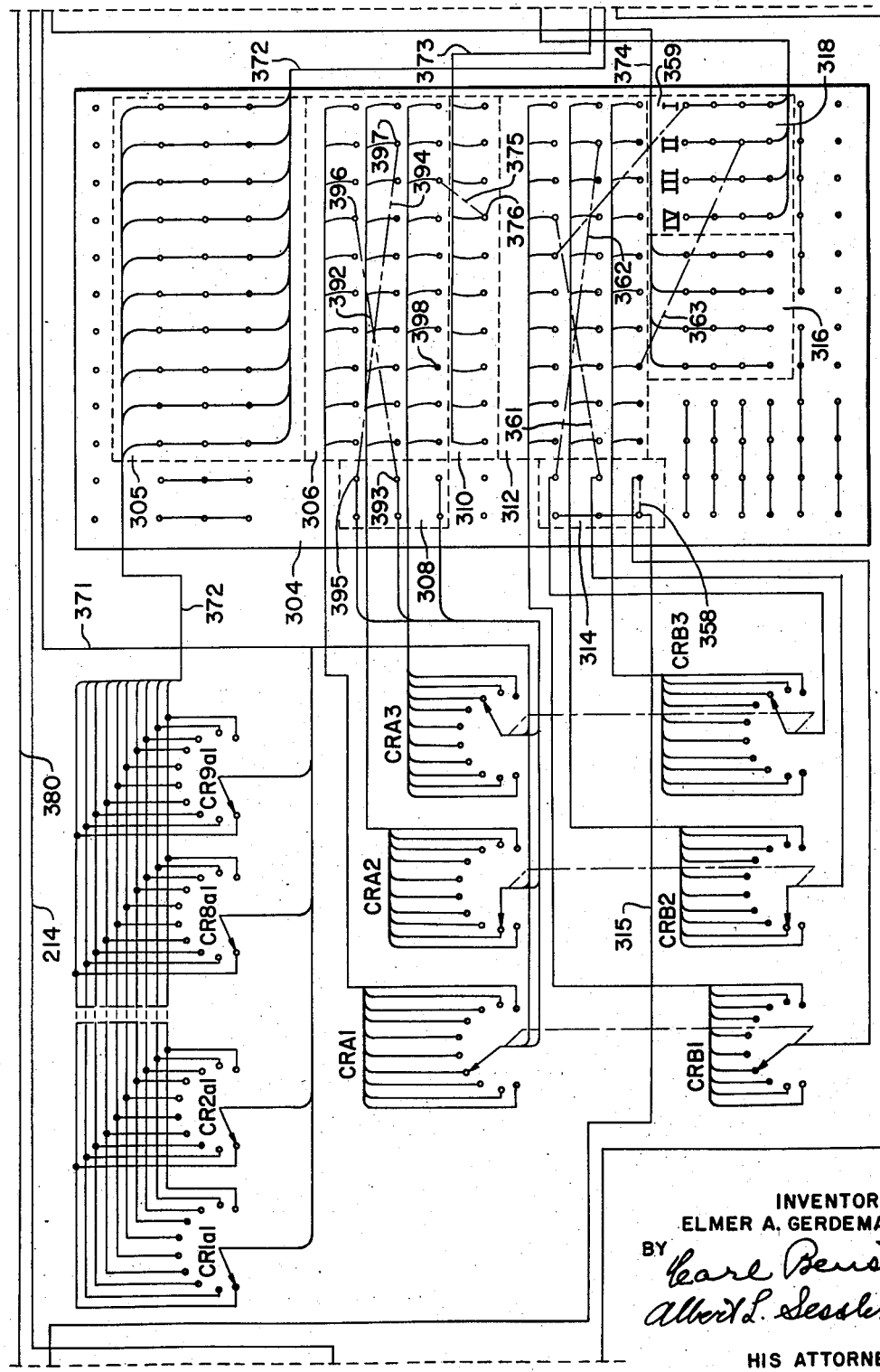

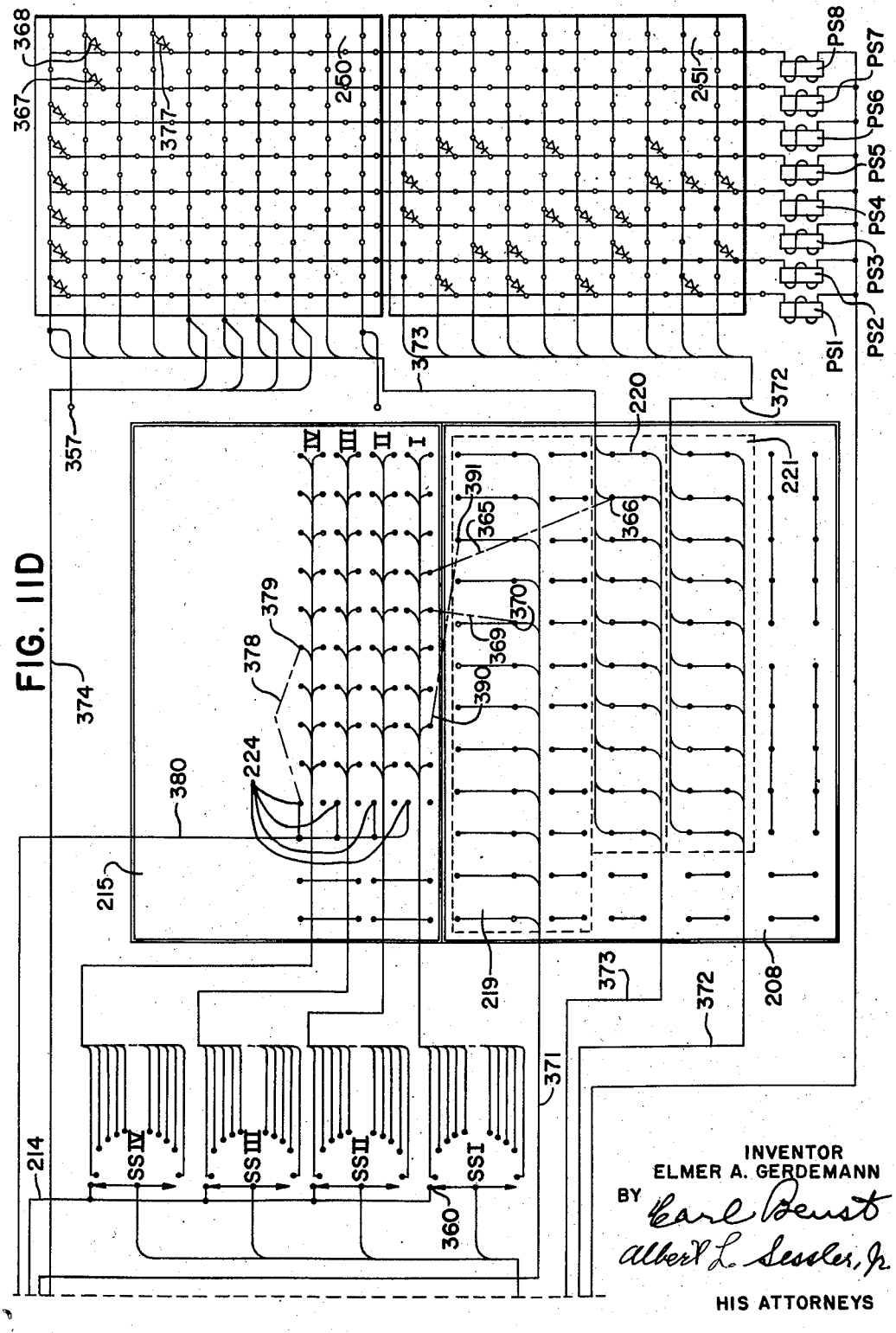

United States Patent Office 2,896,713
Patented July 28, 1959

2,896,713
RECORDING DEVICES

Elmer A. Gerdemann, Dayton, Ohio, assignor to The National Cash Register Company, Dayton, Ohio, a corporation of Maryland Application December 2, 1955, Serial No. 550,728

6 Claims. (Cl. 164—111)

This invention relates to a tape perforating apparatus, and in particular relates to a tape perforating apparatus which can be operated in different punching programs to record related data in proper relation on the tape.

The invention is intended for use in connection with means for transmitting data of various types to the recording machine. The data transmitting means may be a cash register, adding machine, accounting machine, a media reader, or a combination of these, as shown, for example, in the John H. Burns et al. application for United States Letters Patent, Serial No. 488,636, filed February 16, 1955, now Patent No. 2,878,872, issued March 24, 1959. In the embodiment illustrated herein, the recording apparatus is shown electrically connected to a data input device, which may be a cash register, accounting machine, adding machine, or similar device.

An important feature of the present invention is the use of diode encoding boards, which make possible the use of a single input to an encoding board for the simultaneous control of two or more punch selecting means, where previously a single input to an encoding board could control only one punch selecting means, due to the possibility of back circuits, which might otherwise cause erroneous punch operations. The novel diode encoding board of the present invention also enables the changing of the code representation of any digit or symbol merely by the shifting of a diode from one socket to another in the board, or by the substitution of one diode encoding board for another in the recorder.

It is an object of the invention to provide an improved apparatus for recording data on a tape quickly and efficiently.

Another object of the invention is to provide a novel data recording apparatus having a simplified and improved encoding means.

A further object of the invention is to provide a novel data recording apparatus having a simplified and improved encoding means employing uni-directional diode means for connecting digit and symbol terminals to the punch selecting magnets, said encoding means being readily replaceable by another encoding means differently arranged to change the punching code as desired.

An additional object of the invention is to provide an arrangement whereby a single relay is enabled to perform a plurality of functions in the recorder circuitry, thus reducing the number of parts required and the cost of production of the recorder.

With these and incidental objects in view, the invention includes certain novel features of construction and combinations of parts, a preferred form or embodiment of which will hereinafter be described with reference to the drawings which accompany and form a part of this specification.

In the drawings:

Figs. 9 and 10 are block diagrams of the data recording system embodied in the present invention.

Figs. 11A, 11B, 11C and 11D together make up a circuit diagram of the apparatus.

Figure 12:
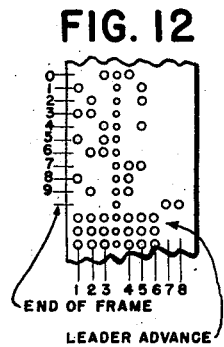

Fig. 12 represents a portion of the tape produced in the recorder and shows the code used to represent the data and the symbols.

Figure 13:
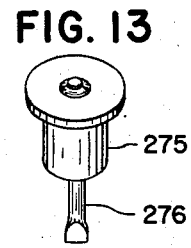

Fig. 13 is a view of one of the diodes which may be inserted in the encoding boards.

General description

The invention illustrated herein provides a means for recording in sequential form, on a tape, data derived from a key-controlled machine. If desired, the data to be recorded may also be derived from a record card or tag by means of a media reader, not shown herein but illustrated in the previously mentioned application, Serial No. 488,636.

Figure 9:
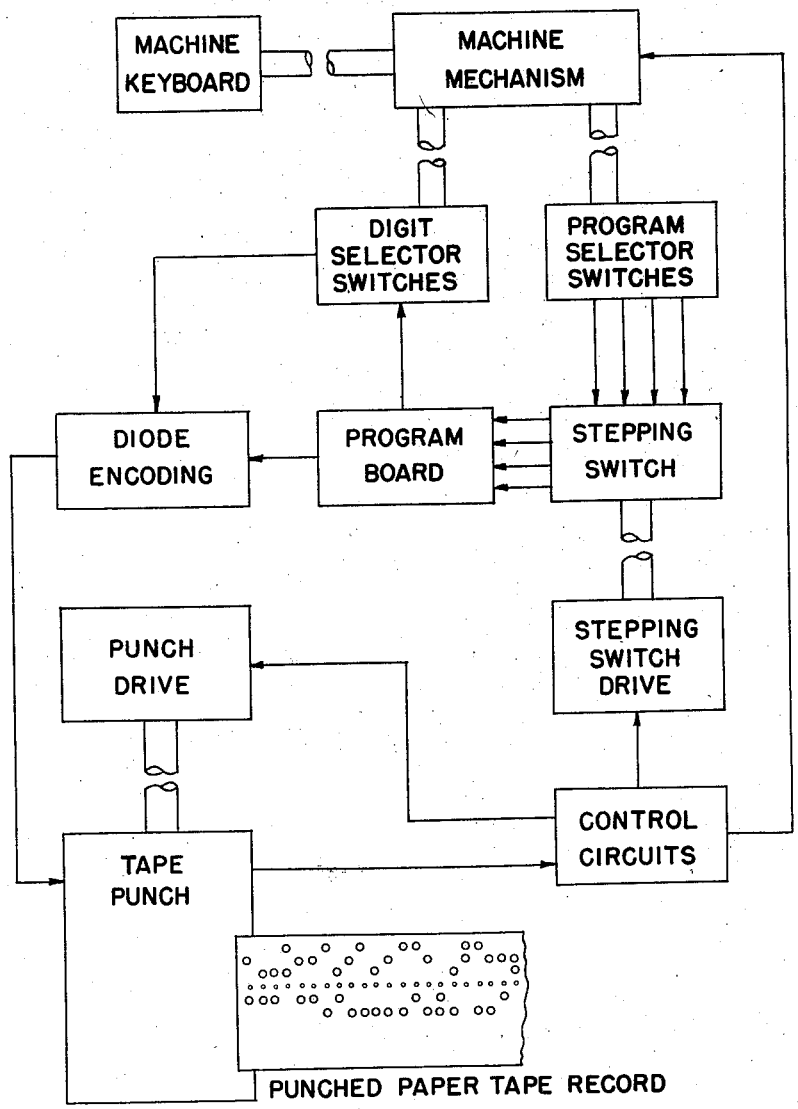

The novel apparatus, as shown schematically in the block diagram of Fig. 9, includes a recorder which can produce the punched tape, and a key-controlled data input machine, on which data can be set to control the recorder to cause a corresponding code to be punched on the tape. The recorder and the data input machine are connected by cables for joint operation, and while in the present embodiment they are separate units, it will be clear from the following description that the two units form a unitary apparatus which could, if desired, be contained in a single cabinet.

The recorder consists of a number of components, each of which performs a specific function during operation of the recorder. One of these components is the tape punch unit, which performs the actual perforation of the tape by means of a plurality of slender rods or punches. One punch is provided for each channel of the tape, and in the present embodiment, nine punches are employed. The punching surface of one of the punches is smaller than that of the others, and this punch punches the smaller tape sprocket feed holes that are used to aline and feed the tape through the punch or through any data processing machine into which it may subsequently be fed. One sprocket feed hole is punched during each cycle of tape punch operation. The other eight punches provide punching in the eight different tape channels. If the tape is narrower than 8 channel tape, some of these punches will not be used. Punching by these punches is controlled, through mechanical coupling, by the punch selecting magnets. If a punch selecting magnet is energized, its associated punch will punch a hole in its tape channel during the punch cycle of operation. The punch selecting magnets are energized by means to be subsequently disclosed. The recorder motor, tape feed reel, and tape take-up reel may also be considered as part of the tape punch unit. The motor supplies the mechanical power necessary to operate the punch. The punch, as it operates, pulls tape from the tape feed reel. The tape take-up reel rewinds the tape after it has been perforated by the punch. It will be seen that the tape punch unit operates whenever recording takes place.

A rectifier forms another component of the recorder. Power, which is supplied to the recorder from an alternating current source, is applied to the recorder motor and to the input of the rectifier, which changes the current for use in all other parts of the recorder circuit.

A third component of the recorder is a stepping switch. This device sequentially selects different connections in a circuit by means of rotatable wipers that are mechanically driven step-by-step in response to the action of an electromagnet. The instant type of stepping switch is prepared for stepping movement by the energization of its operating magnet and actually moves the wipers to the next position when the magnet is deenergized. Each of the wipers engages a series of electrical contacts during its step-by-step rotation. Essentially, it is the stepping switch that determines the sequence in which information will be punched into the tape. The information associated with the electrical circuit connected to the first position of the stepping switch will be recorded first, that related to the circuit which is connected to the second position of the switch will be recorded second, and so on. After all of the desired information in the sequence has been recorded, the wiper is caused to reset to its original, or home, position. If the circuit associated with certain information is not connected to a position of the stepping switch, that information will not be recorded in the sequence.

The information selected to be recorded and the sequence in which it is recorded is termed a "program." Provision is made for four programs in the disclosed embodiment of the invention; however, a different number of programs could be provided, if desirable. These different programs are obtainable because each stepping switch actually contains four or more electrically separate, but mechanically coupled, wipers and related sets of associated contact positions. An assembly consisting of one wiper and its related set of contacts is called a "level" of the stepping switch. Electrical selection of a particular program is accomplished by applying voltage to the wiper associated with that program, and withholding voltage from the remaining wipers. Except for certain special operations, such as punching a "run-in" code into the tape, or recording data from a media reader, the stepping switch is used whenever recording takes place.

In order to obtain sufficient flexibility to meet many different business needs, the recorder of the present invention incorporates a system which permits it to be quickly and easily altered to fit these applications. This process of alteration, since it involves setting up different programs, is called "programming." This programming is electrical in nature, and is accomplished by inter-connecting many points of the electrical circuit of the recorder and its associated equipment. Inter-connections can be readily made because these points have been extended from within the recorder and terminated on an easily accessible, rectangular block called a "program board." Physically, the program board is made up of two sections, mounted one above the other in the recorder. These sections are made of an insulating material, into which a number of metallic receptacles have been imbedded. These receptacles are arranged in a uniform pattern and extend completely through the program board from front to back. Points of the electrical circuit are brought out and connected to the receptacles at the rear of the board. Programming is accomplished by connecting double-ended conductors called plugboard connectors between the proper terminals on the front of the program board. To assist in locating these terminals, the vertical columns of terminals are lettered and the horizontal rows are numbered. Once the program board is wired, it need not be changed so long as the recording system is used for the same applications.

In order to operate with different types of data processing machines, it is necessary that the recorder be able to punch codes used by different data processing machine manufacturers. The process of setting up the recorder to punch a particular code is termed "encoding." This process is accomplished by the insertion into the recorder of a single unit sometimes called the "diode encoding unit," which contains one or more diode encoding boards.

As an example, assume that the data processing machines of a first type represent a digit "2" as a code of one hole punched in tape channel 2; those of a second type represent the same digit as a code of two holes, one in channel 2 and one in channel 5; and those of a third type represent this digit as a code of three holes, one each in channels 1, 4 and 5. To encode a digit "2," the diode encoding board used for the first type would have an electrical connection between the points requiring a digit "2" and the punch selecting magnet PS2. Voltage applied to punch selecting magnet PS2 causes a hole to be punched in the second channel on the tape. The unit of the second type would have electrical connections between the points requiring a digit "2" and punch selecting magnet PS2 and PS5. In a like manner, the unit of the third type would have electrical connections to punch selecting magnets PS1, PS4 and PS5. All electrical connections mentioned require circuit components which effectively allow current to flow in only one direction in the circuit. One well-known type of component having this property is called a diode. Hence the unit is called a diode encoding unit. The necessity for diodes will be subsequently explained.

To operate the recorder with any code, it is only necessary to plug the assembled diode encoding unit for that particular code into the recorder. The diode encoding unit need not be changed so long as its associated system continues to use the same code.

Standard models of adding machines, accounting machines and cash registers require some additional controls in order to operate as the data input portion of the data recording system, described herein. These changes are mainly electrical in nature; therefore most of the additions are either electrical components or mechanical parts, which are added to operate the electrical components.

Data input machines for use with the present recorder must customarily include control switches, which are added to allow the machine operator or a machine mechanism to control the times when voltage is applied to the recording system. Examples of these switches are a power switch, a recorder on-off switch and a start record switch. The power switch is normally a toggle switch which allows the machine operator to turn the system on or off by controlling the A.C. voltage applied to both the machine and the recorder. The recorder on-off switch controls the application of power to the recorder to allow the data input machine to operate without the recorder. The start record switch is an open leaf type switch, which allows a machine mechanism to initiate the recording cycle at a proper time in the machine cycle by controlling the D.C. voltage to the system.

Selector switches must also be present in a data input machine in order to apply voltage to selected connections in the system according to the data to be recorded. The selector switches are actually controlled by associated parts of the machine mechanism, which are in turn controlled by the operator from the keyboard or other suitable setting means.

Certain of the selector switches are program selector switches which permit the operator to select a particular program by setting one or more of the program selector switches to desired positions. This action causes voltage to be applied to the wiper of one of the levels of the stepping switch while the other levels remain unenergized.

Other of the selector switches are data selector switches which are set according to the data to be recorded. These switches can select circuits which may be programmed to cause the data to be punched into the paper tape. The recording system is normally programmed so that a data selector switch causes a digit or other data to be punched, which corresponds to the position of the key depressed in its controlling key bank. If no key is depressed, the switch selects its zero position.

A terminal board, very similar to the recorder program board, also forms a part of the data input machine. In order to differentiate clearly between the two, the board in the data input machine will be termed a selection board. The purpose of the selection board is to ac-accomplish, within the machine, the programming of the machine circuitry that is necessary. Using the selection board in this manner, rather than performing all the programming on the program board, permits a reduction in the number of wires that are necessary to connect the machine.

DATA RECORDING SYSTEM

The block diagram of Fig. 9 shows the major parts of the data recording system. Shafts drawn between blocks indicate mechanical connections. Lines between blocks indicate electrical connections. Arrowheads on these lines show the direction in which the electrical circuit progresses through the system. The starting point in the system is the machine keyboard.

As in the case when using a standard machine, the operator indexes information on the keyboard and starts the operation of the input machine mechanism. This mechanism, in addition to its standard functions, positions the contact arms of the program selector switches and the data selector switches. After these switches are properly positioned, voltage is applied to the program selector switches for the purpose of selecting one of the available programs. Only the desired program is selected because only one of the electrical conductors from the program selector switches to the stepping switch has voltage applied to it. Thus, only one level of the stepping switch is energized. At this time the machine mechanism is locked up under control of the control circuits. This lock-up prevents the machine from cycling again until the sequence of punching is completed; however, data for the next operation may be set up on the keyboard.

With one of its levels energized, the stepping switch starts scanning its contacts in a sequential manner. This action causes voltage to be applied in sequence to the terminals of one of the programs set up on the program board.

There are two main circuits available from the program terminals. If a program position is used to record a special symbol (such as an end-of-frame symbol) or a fixed digit (such as a machine number), the program terminals are connected directly to the points of the encoding section, which encodes the proper symbol or digit. Program terminals used to record keyboard information are connected to the data selector switches. Each of these switches has been differentially set to select a contact position determined by the key depressed in its controlling key bank. The switch contacts, in turn, are connected to the diode encoding section so that they encode a digit corresponding to their position. As seen from this operation, the function of the diode encoding section is to permit voltage to be applied to certain punch selecting magnets which will cause the tape punch to operate to record the desired data, either digit or symbol.

The tape punch is a motor-driven unit which is cycled under control of a single-revolution clutch. As the punch selecting magnets are energized, they set up mechanical conditions to cause the punches to punch the appropriate tape channels, and also apply voltage through the control circuits to the punch drive. This voltage trips the single-revolution clutch, causing the punch cam line to revolve. As the cam line of the punch cycles, the punches which have been mechanically readied by the energized punch selecting magnets perforate the paper tape. Accompanying each data punching is a tape feed sprocket hole, which is automatically punched during every cycle of the cam line.

In addition to the punching actions, the cam line opens a switch to interrupt the control circuits to the stepping switch drive, which causes the stepping switch contact arms to advance to the next contact position. From this contact of the energized level, the same circuit pattern is repeated, causing the coded data from this position to be punched and again advancing the stepping switch contact arms. Data for the entire program is recorded in this manner.

When the information from the last data position has been recorded, the stepping switch contact arms advance to a position which is programmed to perform a "reset" operation. Voltage applied to this reset position causes the stepping switch wipers to return to their "home" position. At this time, the control circuits unlock the machine mechanism, and the system is ready for the next recording sequence.

GENERAL SYSTEM OPERATION

Before the system can operate, the recorder must be connected to its associated input equipment by one or more flexible multi-conductor cables, ample supply of paper tape must be properly installed in the recorder, and the power cord from the machine must be plugged into an outlet supplying electric power at the correct voltage and frequency. Plugging in the power cord causes voltage to be applied to the point marked "110 volts A.C." on the block diagram of Fig. 10, which illustrates the recorder operation. The semi-circular lines connecting various blocks in Fig. 10 represent plugboard connector wires as they are connected to set up a program. These programs may range in length from 1 to 18 digits. However, auxiliary equipment, such as a media reader, when used with the system, will increase the number of possible digits which may be recorded in one program. For clarity of illustration, the block diagram indicates the recording of only three digits of a sample program; a fixed digit "3," a control row digit "7," and an amount row digit "6."

The block diagram of Fig. 10 is divided so that components which are located in the data input machine appear to the left of the heavy, vertical lines, while components in the recorder are located to the right of these lines. With both the power and the recorder on-off switches turned on, the block diagram shows that A.C. voltage is applied to the rectifier. It will be noted that one side of the A.C. line is fused to protect the circuitry from electrical overloads. The D.C. output of the rectifier, labeled R Plus, is applied to one side of the start record switch. This switch is closed after the selector switches have been set according to the data to be recorded.

When the start record switch closes, it applies D.C. voltage to one of the record terminals on the selection board. This terminal is programmed via a plugboard connector to a common terminal, which in turn is electrically connected to the wiper of one of the program selector switches. Wipers of all of the selector switches are mechanically positioned under control of their associated rows of keys. Control row key 7 and amount row key 6 have been depressed in the example shown on the block diagram. The program selector switch connects through its position 7 contacts to the program selector terminals. From this point a plugboard connector is connected to a program terminal to select one of the available programs by applying voltage to the wiper of one of the levels of the stepping switch. For sake of clarity, only the level of the stepping switch which has voltage applied to it is shown on the diagram. The circuit up to this point remains unchanged during the recording of the complete program.

As the stepping switch wiper advances to position 1, it applies voltage to the first program sequence terminal of the selected program. Since the sample program calls for a fixed digit "3" in its first position, the first program sequence terminal is connected by a plugboard connector to the No. "3" digit terminal. This digit terminal is connected to two diodes in a diode encoding board in the diode encoding unit which completes a circuit through punch selecting magnets PS1 and PS2 to the negative side of the rectifier. The energization of punch selecting magnets PS1 and PS2 also initiates the cycle which causes punching in tape channels 1 and 2, and causes the stepping switch wiper to advance to position 2.

With the contact arm on position 2, voltage is applied to the second program sequence terminal of the selected program. This position is connected by a plugboard connector to a control row read-out terminal, which is connected through a cable to the wiper of a control row digit selector switch. Since key 7 in the control row has been depressed, the switch will have been set with its wiper on its seventh contact, hence the wiper completes a circuit through its seventh contact to a digit selector terminal, which is connected by a plugboard connector to the No. 7 digit terminal. This terminal is connected by a cable to a diode encoding board in the diode encoding unit. In the diode encoding board, the digit terminals are electrically connected through diodes to the punch selecting magnets, in accordance with the code being used. For a "7" in the sample code, there are diode connections to punch selecting magnets PS4 and PS5. Voltage applied to these punch selecting magnets results in a "7" being punched into the tape, and advances the stepping switch wiper to position 3.

As the wiper of the stepping switch reaches position 3, it applies voltage to the third program sequence terminal. The circuit proceeds over a plugboard connector to an amount row read-out terminal and then, through a cable, to the wiper of an amount row digit selector switch. Since key 6 has been depressed in the associated amount row, the switch will have been set with its wiper on the sixth contact, hence, the circuit continues through the sixth position of the switch to the diode encoding board. To record a 6 in the sample code, diodes are inserted into the encoding board to connect the 6 contact to punch selecting magnets PS2 and PS3. Voltage applied to these punch selecting magnets selects these punches and initiates a punching cycle, causing a "6" to be recorded, and advancing the wiper of the stepping switch to position 4.

If the recording of the amount row digit of position 3 of the stepping switch concludes the recording of data in the program, position 4 of the stepping switch must be connected to perform a resetting operation. Such a connection is not shown on the block diagram but is shown fully in the circuit diagram. This operation causes the stepping switch to return to its "home" position, and removes the D.C. voltage from the recording circuit. The system is now ready to record additional data as soon as the data input device is set to the new data and closes the start record switch to initiate another recording cycle.

DETAILED DESCRIPTION

Recorder

The novel recorder is shown in Figs. 1 to 8 and is operable to punch the tape with data under joint control of program control means in the recorder and the data input machine. The recorder can in turn control the operation of the data input machine so that it will exert its controls at the proper time. Inter-controls between the recorder and the data input machine prevent the sending of further data to the recorder if the recorder has not recorded data previously sent thereto.

Figure 1:
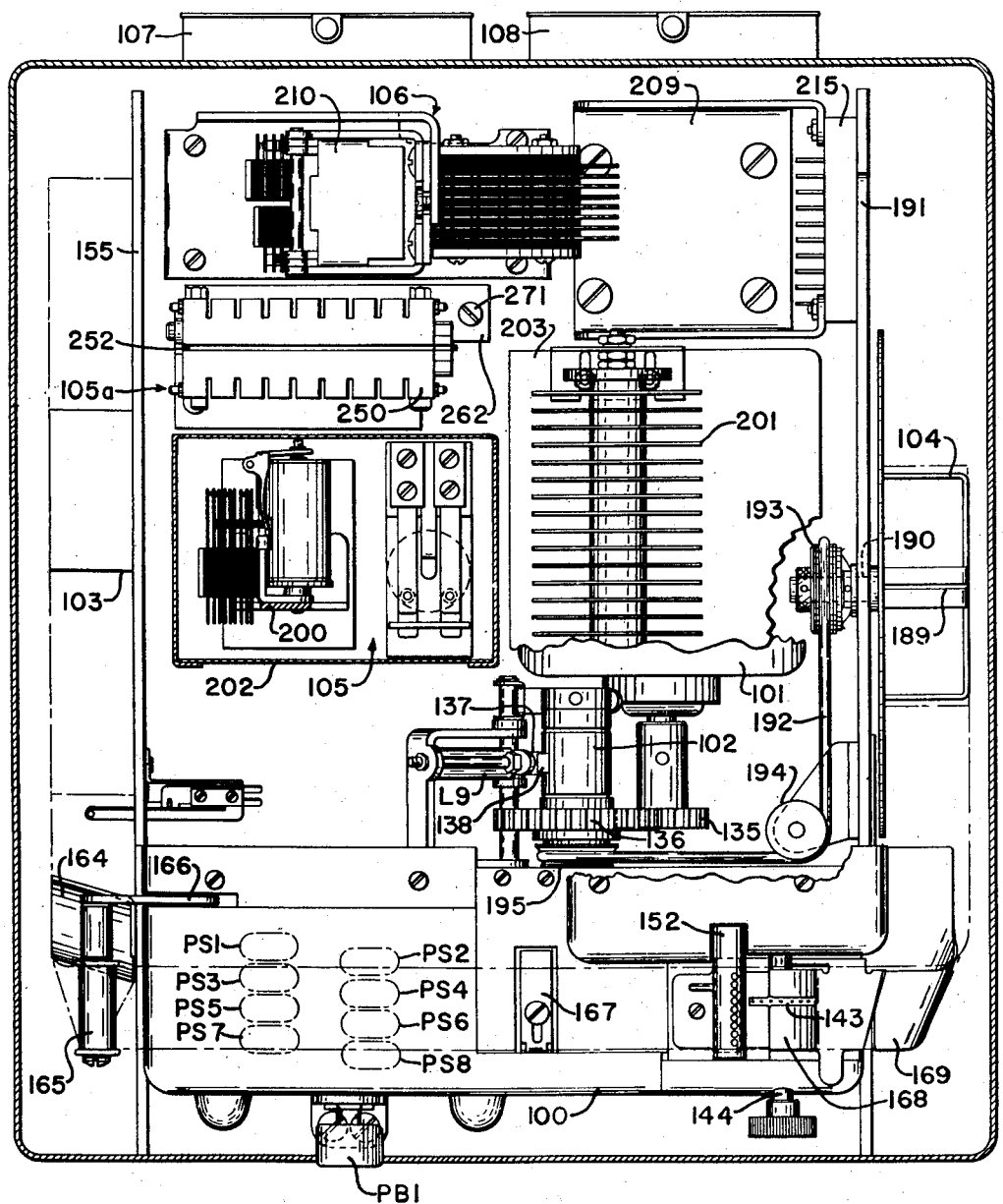
Fig. 1 is a top plan view of the recorder with the cabinet removed, and with the wiring and certain parts of the recorder omitted in order that other parts may be seen more clearly.

As shown most clearly in Fig. 1, the recorder includes a punching mechanism 100; a motor 101, for driving the punching mechanism; a clutch 102, for connecting the motor to the punching mechanism; a tape-supporting arbor 103, on which a supply of tape can be mounted; a take-up reel 104, on which the punched tape can be wound as it is punched; a control relay section 105, which houses control relays used to coordinate the operation of the data input machine and the recorder; a diode encoding unit 105a; and a programming means 106, including a stepping switch and plugboard for providing the various programs or punching sequences necessary to coordinate the recording of data in proper sequence on the tape under control of the reader and the cash register.

The recorder is provided with two receptacles, 107 and 108, in which plug connectors on cables which connect the recorder to the data input machine can be inserted.

A leader advance push button PB1, which is provided at the front of the recorder, is effective, when operated, to cause the recorder to operate and perforate the tape with the leader advance pattern of perforations. The manner in which the leader advance push button PB1 controls the operation of the recorder will be fully explained when the circuit diagram of Figs. 11A, 11B, 11C and 11D is described.

Punching mechanism

Figure 2:
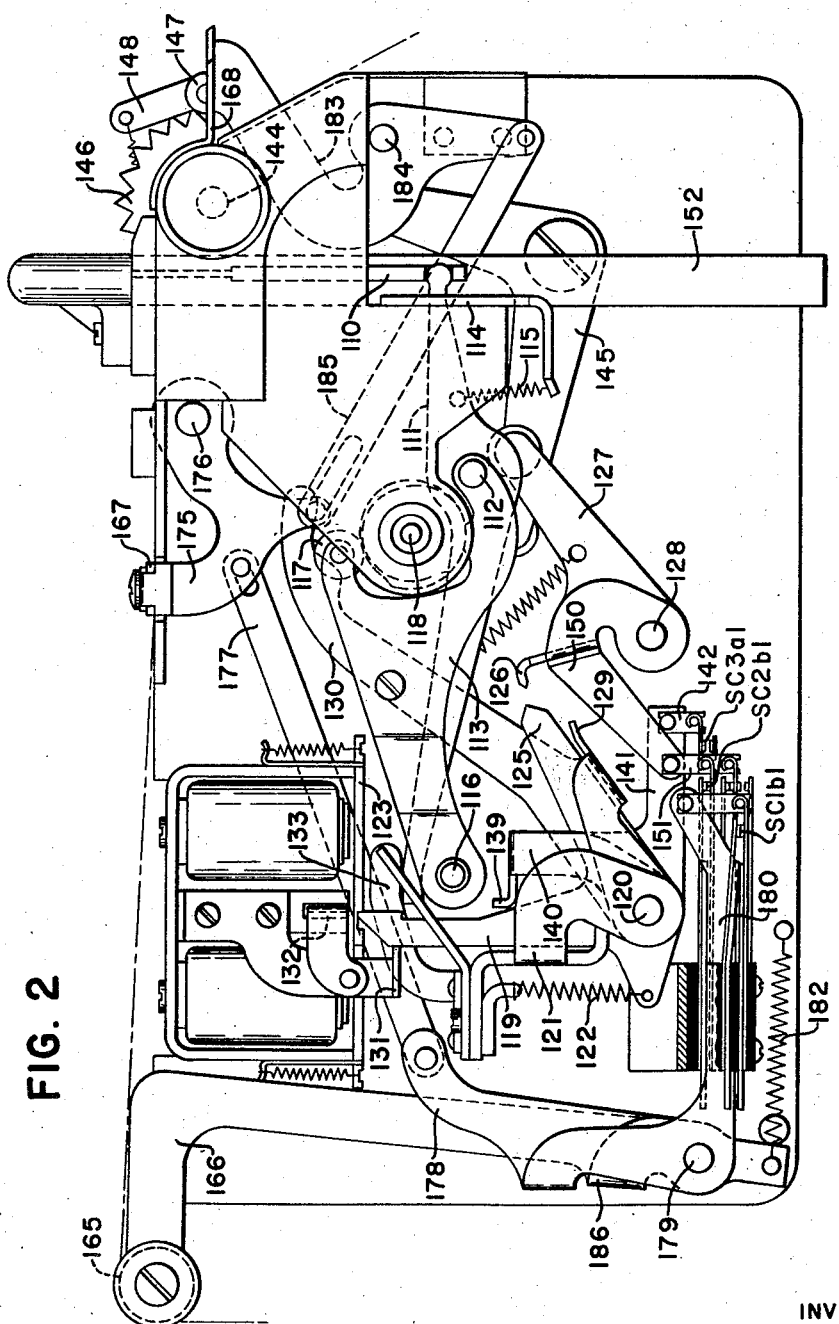
Fig. 2 is a side elevation of the punching mechanism used in the recorder.

The punching mechanism, which is shown in Figs. 1 and 2, is a tape-punching mechanism of the type shown in the United States patent to Francis E. Hamilton et al., No. 2,540,029.

The punching mechanism includes nine punches 110 for punching the rows of perforations across the tape, one for each of the eight channels on the tape, which are used in combinations to encode data, and one for punching the feed holes.

Fig. 12 shows a fragment of the tape in which an end-of-frame symbol and the digits "0" to "9" have been perforated and in which a leader advance portion has been punched.

The end-of-frame symbol is used to indicate the end of the information pertaining to a single transaction or bit of data in order to separate the various bits of information carried by the tape. The symbols and numbers to the left of the tape in Fig. 12 correspond to the data punched on the tape, and the numbers at the bottom of the tape identify the channels across the tape.

Each operation of the punching apparatus, whether punching data or a leader advance pattern on the tape, causes a feed hole to be perforated in the tape. These feed holes assist in feeding the tape through the punching apparatus and also through the sensing means which analyzes the tape.

The manner in which the punches are selected and operated will now be explained with reference to Fig. 2. Each punch 110 is pivotally connected to the right end of an actuating lever 111, which is pivoted intermediate its ends on a rod 112 in an actuating frame 113. The right ends of the levers 111 are guided in a comb plate 114 and are urged downwardly by springs 115.

The actuating frame 113 is pivoted at 116 and has rollers 117, which engage cams on a cam shaft 118 to rock the actuating frame 113 counter-clockwise from home position and then back to home position to raise and lower the rod 112, upon which the actuating levers 111 are pivoted.

The effectiveness of the actuating levers to operate the punches is controlled by a plurality of magnetically-controlled punch-selecting levers 119, which are pivoted on a rod 120, carried by a bracket 131, and which are urged clockwise by springs 122. The selecting levers 119 are normally retained in their retracted, or non-effective, position, as shown in Fig. 2, by notches in the armatures 123 of punch-selecting magnets PS1 to PS8. When the lever is in its retracted position, it is out of engagement with the left end of the actuating lever 111, and this end is free to rise when the frame 113 raises the rod 112, causing the actuating lever 111 to pivot about its right end, the right end of the actuating lever being loaded by the spring 115. In this operation, the punch 110 will not be operated to punch the tape.

When a punch-selecting magnet PS1 to PS8 is energized, it moves its armature 123 away from the punch-selecting lever 119, freeing the lever 119 for clockwise movement by the spring 122 until the end of the selecting lever engages over the left end of the actuating lever 111 to prevent the left end from rising when the actuating frame 113 raises the rod 112. Since the left end of the actuating lever is positively held by the punch-selecting lever against upward movement, the spring 115 will yield when the frame 113 is rocked, and the right end of the actuating lever 111 and the punch 110 will be forced upwardly to perforate the tape. One or more punch-selecting magnets may be energized in each punching operation according to the encoding of the symbol or numeral being punched.

Each of the selecting levers 119 has a forwardly-extending portion 125, with which a locking plate 126 can engage. The plate 126 is carried by a lever 127, which is pivoted on a rod 128 and is operated by a cam on the shaft 118 to lock the levers from 45 degrees to 185 degrees of the operation of the cam shaft 118, the actual punching portion of the operation of the punching mechanism. When operated, the plate 126 engages the forwardly-extending portions 125 of the selecting levers to lock those levers in normal position which have not been released by the punch selector magnets and lock those levers in moved position which have been released to select their related punches for operation.

The forwardly-extending portions 125 of those levers which have been released and have rocked downwardly will engage a restoring plate 129. The plate 129 is pivoted on the rod 120 and is rocked counterclockwise by a cam-actuated arm 130 near the end of the punch operation. In order to insure that the selecting levers will be properly restored to the control of the punch-selecting magnets PS1 to PS8, the restoring plate 129 provides a slight overthrow movement to the levers, and one of the levers engages a flange 131 on one arm of a bail 132 to rock the bail clockwise, which bail forces all the armatures away from the magnets and into engaging relation with the selecting levers.

Since a feed hole is punched in each operation of the machine, regardless of the selection of punches by the magnets, the punch-actuating lever for the feed hole punch has its left end blocked against upward movement at all times. An arm 133, which is secured to the bracket 121, extends over the end of the actuating lever to cause the lever to force the punch upwardly in each operation of the punching apparatus.

The driving means for the punching mechanism is shown in Fig. 1. The motor 101, which is constantly rotating whenever the recorder is operable, is connected by gears 135 and 136 to the input of clutch 102, which, when tripped, will connect the drive to the cam shaft 118 of the punching mechanism to cause the cam shaft to make one revolution. A punch clutch trip magnet L9 is provided and, when energized, will remove a block 137 from a projection 138 on the clutch to allow the clutch to operate to drive the punching mechanism.

The punch clutch trip magnet L9 is energized each time one or more of the punch-selecting levers 119 is released. A bail 139 (Fig. 2) extends across the selecting levers 119 and is carried by a pair of arms 140 pivoted on the rod 120. One of the arms is formed with an extension 141, which is connected by a link 142 to operate contacts SC3a1. When any one of the punch-selecting levers 119 is rocked, upon its release by its related armature 123, it will rock the bail clockwise to close the contacts SC3a1. This will energize the clutch trip magnet L9 to render the clutch effective to connect the motor to the cam shaft 118 to drive it through one revolution.

A tape-feeding pin-wheel 143 (Fig. 1) is mounted on a shaft 144 (Fig. 2) and has, in its periphery, pins which engage the feed holes in the tape to advance the tape after it is punched, the pin-wheel being driven by a pawl-and-ratchet drive from a lever 145 (Fig. 2), which is rocked by a cam on the cam shaft 118. A detent wheel 146, also mounted on the shaft 144, cooperates with a roller 147 on a lever 148 to accurately position the pin-wheel 143.

An extension 150 on the locking-plate-actuating lever 127 is connected by a link 151 to the contacts SC2b1. At 90 degrees in the operation of the punching mechanism, when the locking plate 126 is rocked to lock the selecting levers 119 in position, contacts SC2b1 will be opened. These contacts will remain in this condition until 185 degrees of the operation of the punching mechanism, when the lever 127 is rocked to unlock the punch-selecting levers, at which time contacts SC2b1 will be closed. The controls exerted by contacts SC2b1 will be explained fully when the circuit diagram of Figs. 11A, 11B, 11C and 11D is explained.

The particles of tape which are removed from the tape as perforations are made are guided by a chute 152 to a drawer (not shown), which can readily be removed from the recorder.

*Tape-handling means*

Figure 4:
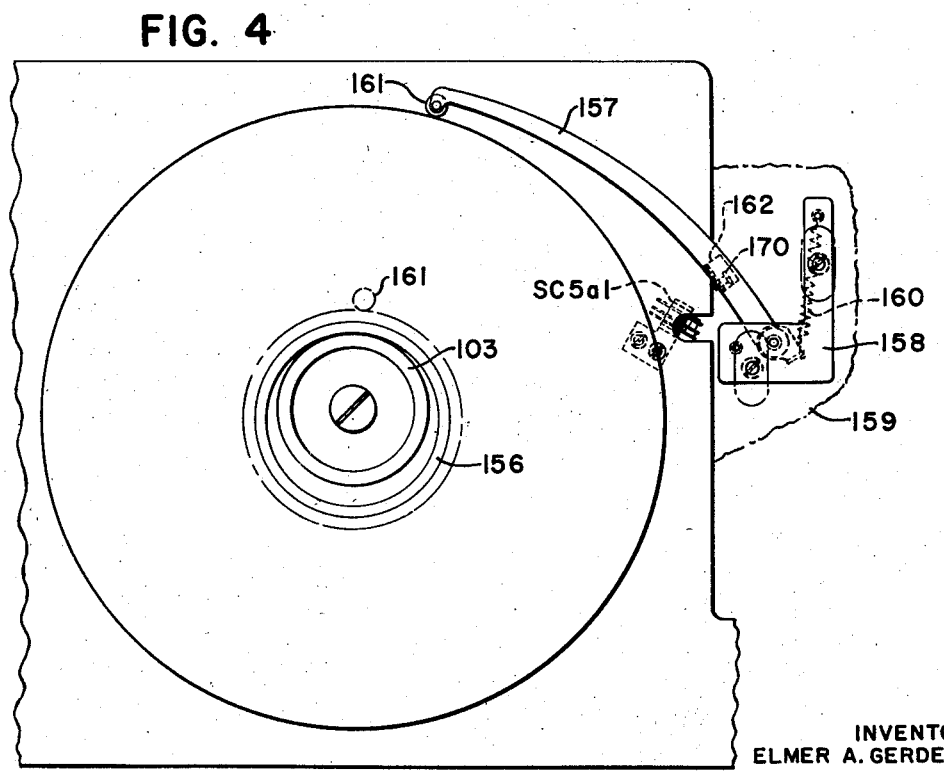
Fig. 4 is a side elevation of the tape supply means and the warning means for causing a signal to indicate when the tape supply is low.
Figure 5:
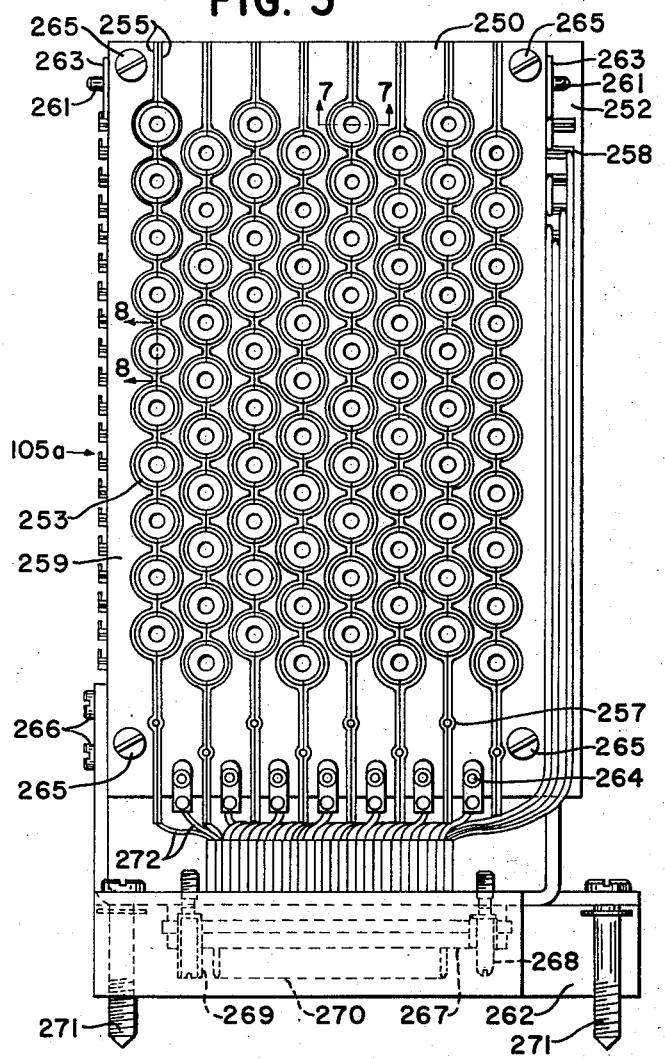
Fig. 5 is a front elevational view of one of the diode encoding boards of the recording apparatus.

The various means for handling the tape in the recorder are seen in Figs. 1, 2, and 4.

The tape-supporting arbor 103 is secured to a side frame 155 of the recorder and is smaller than the inside diameter of the core 156 of a roll of tape. Since the arbor 103 does not rotate, the friction between it and the inside of the core provides enough drag on the tape to maintain the proper tension on the tape as it is supplied to the punching mechanism.

A lever 157 (Fig. 4), pivoted on a bracket 158, secured to the cabinet 159 of the recorder, is urged counter-clockwise (Fig. 4) by a spring 160 to maintain a roller 161 on the end of the lever 157 in contact with the roll of tape on the arbor. The roller 161 will descend as the diameter of the roll of tape on the core decreases, allowing the lever 157 to rock counter-clockwise until, when the roller 161 reaches the position shown in dot-and-dash lines, the end surface of an adjusting screw 170 mounted in a bracket 162 on the lever closes the contacts SC5a1, which are mounted on the side frame 155. Provision of the adjusting screw 170 enables a fine adjustment to be made of the exact point at which contacts SC5a1 will be closed. Contacts SC5a1 close a circuit to a signal light 163 (Fig. 11A) on the data input machine to provide a warning signal to the operator to indicate that the tape supply is low.

The tape is guided from the bottom of the supply roll, under a guide plate 164 (Fig. 1), over a roller 165 on a tension control lever 166, under a tape feeler 167, through the punching section of the punching mechanism, over the pin-wheel 143, and under a cooperating pressure plate 168, around a guide 169 to the take-up reel 104.

The tension control arm 166, the tape feeler 167, and the pressure plate 168 cooperate to open contacts SC1b1 in the circuit to the punch clutch trip magnet L9 to prevent an operation of the punching mechanism under the following conditions, which would contribute to an improper punching of the tape.

The tape feeler 167 is carried by an arm 175, which is pivoted on a stud 176. With a supply of tape in the punching mechanism, the feeler 167 will be supported by the tape; but, as soon as the tape breaks or the end of the tape passes the feeler, the feeler will drop downwardly and rock the arm 175 counter-clockwise (Fig. 2) about the stud 176. A link 177 connects the arm 175 to an arm 178 of a yoke pivoted on a stud 179, the other arm, 180, of which yoke is connected by a link 181 to the contacts SC1b1. A spring 182 normally urges the yoke counter-clockwise to maintain the contacts SC1b1 closed. When the arm 175 rocks counter-clockwise, it will pull the link to the right (Fig. 2) and will rock the yoke clockwise to open the contacts SC1b1.

The contacts SC1b1 are also opened when the pressure plate 168 is moved away from the pin-wheel 143. The pressure plate 168 is mounted on a lever 183, pivoted on a stud 184. A link 185 is connected to the lever 183 and has a pin-and-slot connection with the arm 175, so that, whenever the lever 183 is rocked to move the pressure plate away from the pin-wheel, the link 185 will rock the arm 175 clockwise to raise the feeler 167 above the tape. The clockwise rocking of the arm 175 will pull the link 177 to the right and rock the yoke to open the contacts SC1b1.

A further control of the contacts SC1b1 prevents punching if there is too much tension on the tape and improper punching would result. The roller 165 is supported at the upper end of the lever 166, which is pivoted on the stud 179 and is formed at its lower end with a yoke 186, which straddles the arm 178. If the feeding of the tape from the storage reel becomes blocked and the feeding of the tape by the pin-wheel 143 continues, the tension on the tape will be increased and will shift the roller 165 to the right (Figs. 1 and 2), rocking the lever 166 clockwise. The yoke 186 will rock the arm 178 and its connecting arm 180 clockwise to open the contacts SC1b1. As soon as the tension has been relieved, the spring 182 will return the arms 180, 178 and 166 to their normal position and will allow contacts SC1b1 to reclose.

After the tape has been punched, it passes around the guide plate 169 and around the under side of the take-up reel 104, which reel is slotted at 189 to receive the end of the tape. The take-up reel is mounted on a shaft 190 journaled in the recorder side frame 191 and is yieldably driven by a belt 192, which runs over a pulley 193 on the shaft 190, over a pair of guide pulleys 194, and over a driving pulley 195 on the punching mechanism cam shaft 118 and gives the reel an increment of movement each time the punching mechanism operates. Power is transmitted from pulley 193 to shaft 190 by means of a friction drive, so that the take-up reel will be driven with enough force to take up the tape as it is punched but will slip before applying sufficient force to the tape to pull the tape improperly through the punching mechanism.

The tape, therefore, will be pulled from the supply roll as needed by the punching mechanism and will be wound on the reel 104 as it is punched.

*Control relay section*

The control relay section 105 houses the relay K3, which interlocks the data input machine and the recorder to prevent the data input machine from being operated while the recorder is operating, and also houses relay rack 200, which supports the control relays K1 and K2, which are shown in the circuit diagram, Figs. 11A, 11B, 11C and 11D. A shielding dust cover 202 surrounds the relays of the relay section.

The D.C. operating power for the control circuits, including the relays K1, K2 and K3 is obtained from the rectifier 201, which is mounted on a supporting platform 203 above the motor 101.

Whenever operating power is properly supplied to the control circuits, a signal light 205 on the front of the data input machine is lighted. This light serves to indicate to the operator that the apparatus is in operating condition.

*Programming means*

Figure 3:
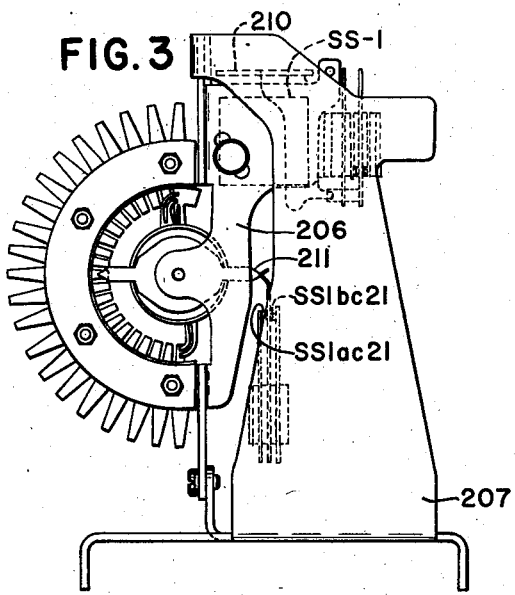
Fig. 3 is a side elevation of the stepping switch used to provide the controls in the various punching programs which it is possible to carry out with the recorder.

The programming means 106 is shown particularly in Figs. 1 and 3, and includes a stepping switch 206, mounted on a supporting bracket 207, secured to the base of the recorder, and a recorder program unit, made up of a lower program board 208 and an upper program board 215 (Figs. 1 and 11D), mounted one above the other on a bracket 209, secured to the recorder base.

The stepping switch is an 8-level, 20-position switch, having a stepping magnet SS1 and the usual wiper driving means, which is operated by the magnet armature 210, and is conditioned when the magnet is energized, and is operated and causes the wipers to be advanced when the magnet is deenergized. A pair of cams 211 (Fig. 3), which are secured to the wipers to rotate therewith, cooperate with contacts SS1ac21 and SS1bc21 so that contacts SS1ac21 are closed in all positions of the stepping switch except the home position, and contacts SS1bc21 are opened in all positions of the stepping switch except the home position. The armature 210 also operates two banks of contacts, including contacts SS1a3, which are closed when the magnet SS1 is energized; and SS1b1 and SS1b11, which are opened when the magnet is energized (see also Fig. 11B). The manner in which these contacts exert their control will be explained when the circuit diagram (Figs. 11A, 11B, 11C and 11D) is described.

A single level of the switch is required for each program, the level SSI being used for program I, level SSII being used for program II, etc. The eight levels of contacts of the stepping switch may be used to obtain the necessary controls for eight programs, each program being capable of providing up to 18 steps in a punching sequence. In order to avoid needless duplication, only four levels are shown in the circuit diagram (Figs. 11A, 11B, 11C and 11D).

The first 19 contacts of level SSI are individually connected to corresponding terminals in the upper program board 215 to enable the circuit to be completed to the various terminals in sequence, as the stepping switch wiper is advanced over its related bank of contacts, the wiper being connected to a corresponding terminal on the selection board of the data input machine, as will be subsequently described in detail. Similarly, the contacts of levels SSII, SSIII and SSIV are individually connected to corresponding terminals in the upper program board 215. The 20th contacts of the several levels are connected together to a conductor 214, which is used to control a circuit to initiate the stepping of the switch from its home position, as will be explained when the circuit diagram of Figs. 11A, 11B, 11C and 11D is described.

The lower program board 208 has a section 219, containing groups of terminals which are connected to the wipers of the selector switches CR1a1 to CR9a1 related to rows 1 to 9 of the data input machine. By suitably connecting terminals in the upper program board 215 to terminals in section 219 by plug-board connectors, any desired number of the selector switches of the data input machine can be made effective to control the recorder in any desired sequence, as the stepping switch is stepped through its various positions, as will be fully explained when the circuit diagram of Figs. 11A, 11B, 11C and 11D is explained.

A special symbol section 220 of the lower program board 208 contains a plurality of terminals which are connected to corresponding input lines on the diode symbol encoding board 250. This arrangement enables the direct recording of special symbols in certain program sequences by suitably connecting terminals to the upper program board 215 to terminals in section 220 by plug-board connectors.

A digit section 221 of the lower program board 208 contains a plurality of terminals which are connected to the corresponding input lines on the diode digit encoding board 251. This arrangement enables the direct recording of digits by suitably connecting terminals in the upper program board 215 to terminals in section 221 by plug-board connectors.

The upper program board 215 contains a plurality of reset terminals 224, one for each level of the stepping switch, which are connected together and to a circuit for causing the stepping switch to be reset to home position at the end of any of the programs.

The remaining terminals of the program boards 208 and 215 are connected together in groups to supply buses which may be used to expand the capacity of the other sections, as desired.

The manner in which the various sections of the upper and lower program boards are inter-connnected and exert their controls in building up programs will be explained fully when the circuit diagram is described.

*Diode encoding unit*

The novel diode encoding unit 105a of the present invention is shown in Figs. 1, 5 to 8 inclusive, and 11D, and comprises a diode symbol encoding board 250, a diode digit encoding board 251, an insulating plate 252 positioned between the two boards, and a bracket 262 for detachably securing the unit in operative position on the recorder base.

As shown in Fig. 13, the diodes which are used with the encoding boards are mounted in suitable containers which enable them to be inserted in the encoding boards, the container having an enlarged cylindrical portion 275 to which one side of the diode is connected and having a smaller diameter extension 276 from one end which is insulated from the cylindrical portion and to which the other side of the diode is connected.

Each of the diode encoding boards includes eight columns of diode sockets or receptacles 253 to receive the enlarged cylindrical portion 275 of the container for a diode, each column containing ten sockets. Adjacent columns are staggered with respect to each other to permit closer relative placement for maximum compactness of the diode encoding unit.

Each column of sockets is formed by two opposed complementary metal strips 255, each of which is shaped in a succession of semi-circular bends, or half-cup shapes, to form half of each socket in the column. Each of the semi-circular portions has two sharp tips 256 (Figs. 7 and 8) formed therein, to cut into the surface of the diode container placed in the socket, to make a good electrical contact and to retain the diode securely in position. Near the lower end of the diode boards, the metal strips 255 of each column are additionally shaped to form an auxiliary plug connection 257.

Figure 6:
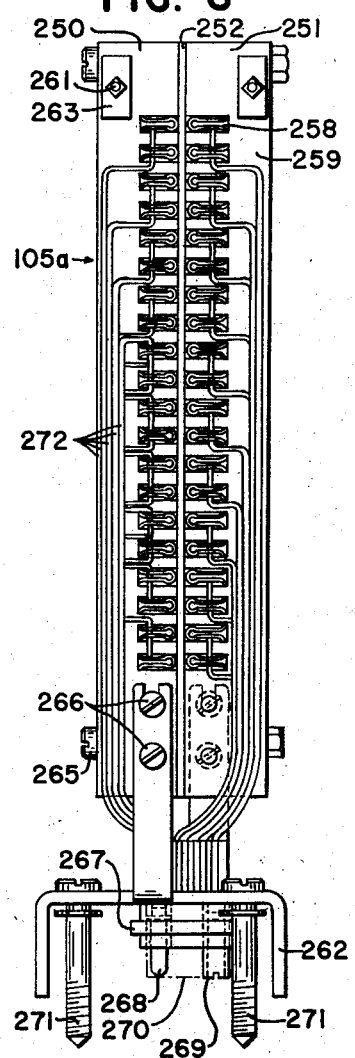
Fig. 6 is an end elevational view of the diode encoding boards shown in Fig. 5.
Figures 7, 8:
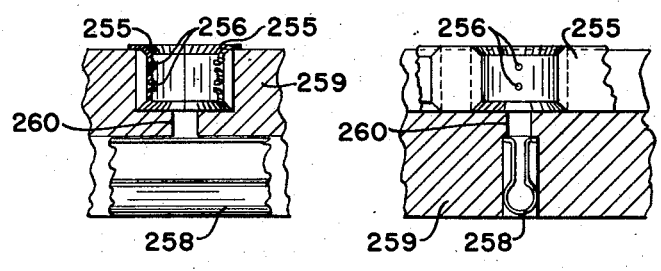
Fig. 7 is a sectional view taken on line 7—7 in Fig. 5.
Fig. 8 is a sectional view taken on line 8—8 in Fig. 5.

At right angles to the columns, and positioned beneath them in the diode encoding boards are rows of conductors 258. Due to the previously mentioned staggering of the columns, a total of 20 conductors is required, each conductor being placed in alinement with four diode sockets. Each conductor 258 is a metal strip bent to form a U in cross-sectional shape, as shown in Figs. 6 and 8, to receive the extension 276 of a diode container.

The column strips 255 and conductors 258 are positioned in corresponding recesses of a molded block of insulating material 259 to form the diode encoding boards. The block is formed with a bore 260 between each of the sockets and its corresponding conductor, to permit the extension 276 of the diode container to make contact with the conductor 258. At the upper and lower ends of the block 259, a rod 261, made from an insulating material, is provided to retain the strips 255 in position in the block. These rods are secured in place by speed nuts 263 at each end thereof.

Near the lower edge of each diode encoding board is a series of seven taper pin receptacles 264, for use to enable additional circuit connections to be made to the diode encoding unit.

Each set of two boards 250 and 251 is secured in back-to-back relationship by means of four bolts 265, to form a diode encoding unit 105a. The insulating plate 252 is positioned between the boards 250 and 251.

The diode encoding unit also includes a bracket 262, to which boards 250 and 251 are fastened by bolts 266. The bracket includes a plug unit 267 secured thereto by threaded fasteners 268 and 269, and having plug prongs 270 adapted to be inserted into corresponding sockets in the recorder base to complete electrical circuits to the diode encoding unit. The threaded fasteners 268 and 269 are formed with male and female connectors, respectively, at their lower ends, for cooperation with complementary connectors on the recorder base. It is thus rendered impossible to plug the diode encoding unit into the base backward, or otherwise incorrectly. The braket 262 is additionally secured to the base by bolts 271.

The metal strips 255, the conductors 258, and the taper pin receptacles 264 are all connected to their corresponding prongs 270 in the plug unit 267 by electrical connectors 272. Each complementary pair of metal strips 255 is provided with a single connector for connection to its plug prong. The two conductors 258 in each of the pairs required for the corresponding sockets in the eight columns are connected together by the same electrical connector 272 which connects them to their corresponding prong 267.

*Data input machine*

As has been previously stated, any conventional type of machine, such as a cash register, adding machine, or accounting machine, may be made suitable for use as a data input machine for the recorder of the present invention by the addition of necessary components, which are mainly electrical in nature. Therefore, the description of the data input machine, which forms a part of the system described herein, will be restricted to such components.

A main power switch MPS (Fig. 11A) located in the data input machine, is a toggle switch which allows the machine operator to turn the system on or off by controlling the A.C. voltage applied to both the machine and the recorder.

A recorder on-off switch 300 (Fig. 11A), located in the data input machine, is a toggle switch which allows the machine operator to disable the recorder, so that the data input machine may be operated without operating the recorder, if desired.

A start record switch SC42a1 (Fig. 11B), located in the data input machine, is an open leaf type switch which allows the machine mechanism to initiate the recording cycle by controlling the D.C. voltage to the system.

A motor bar switch 301 (Fig. 11A), located in the data input machine, is a switch which is depressed to initiate machine operation after appropriate keys have been depressed on the data input machine to set up the amount and type of the transaction to be recorded. Closing of the motor bar switch 301 energizes a solenoid L1 (Fig. 11A), which in turn closes a motor switch L1a1 to complete an A.C. circuit through the data input machine motor 302, to cause the same to operate.

A speed control switch 303 (Fig. 11A), located in the data input machine, is provided for regulating the speed of the data input machine motor 302.

Each amount key bank of the data input machine is provided with a data or digit selector switch CR1a1 to CR9a1 (Fig. 11C), which it positions according to the amount set up on the keyboard. The recording system is normally programmed so that a digit selector switch causes a digit to be punched, which corresponds to the position of the key depressed in its controlling key bank. If no key is depressed in a bank, the switch for that bank selects its zero position. Only four of the digit selector switches are actually shown in Fig. 11C in order to avoid needless duplication. In the present embodiment, it is contemplated that there will be nine amount key banks in the data input machine, and therefore nine digit selector switches, but any desired number of amount key banks could be used on a data input machine for the present system.

Each control key bank of the data input machine is provided with two selector switches CRA1 to CRA3 and CRB1 to CRB3 (Fig. 11C), which are positioned according to which control key is depressed. The wipers of the selector switches CRA1—CRB1, CRA2—CRB2 and CRA3—CRB3 of each control key bank are tied together and assume the same relative positions in their respective switches. The recording system is normally programed so that the switches CRA1 to CRA3 causes a symbol to be punched corresponding to the control key or keys depressed in the various rows, while the switches CRB1 to CRB3 cause voltage to be applied to the wiper of one of the levels of the stepping switch 206 to select a punching program while the other levels remain unenergized. The three sets of control switches may be used singly or in combination, to control punching operation and program selection. In the present embodiment it is contemplated that there will be three control key banks in the data input machine, and therefore three control punch selector switches and three control program selector switches, but any desired number of control key banks could be used on the data input machine for the present system.

Another component of the data input machine is a selection board 304 (Fig. 11C), which is mounted in the machine and is used to accomplish the necessary programming of the machine circuitry.

A first section 305 of the selection board 304 contains a plurality of terminals which are connected over connectors 372 to the corresponding input lines on the diode digit encoding board 251.

Another section 306 of the selection board 304 contains a plurality of groups of terminals which are connected to the several corresponding contacts of the control punch selector switches CRA1 to CRA3.

A further section 308 of the selection board 304 contains a plurality of terminals which are connected to the wipers of the control punch selector switches CRA1 to CRA3.

An additional section 310 of the selection board 304 contains a plurality of terminals which are connected by conductors 373 to the corresponding input lines of the diode symbol encoding board 250.

A section 312 of the selection board 304 contains a plurality of terminals which are connected to the several corresponding contacts of the control program selector switches CRB1 to CRB3.

Another section 314 of the selection board 304 contains a plurality of terminals which are connected to the wipers of the control program selector switches CRB1 to CRB3, and also contains a corresponding plurality of terminals which are connected to a conductor 315. A connection between the conductor 315 and the wiper of any desired one of the switches CRB1 to CRB3 may be made by plugging a plugboard connector between the terminal connected to the wiper of the desired switch and the corresponding terminal connected to the conductor 315.

An additional section 316 of the selection board 304 contains a plurality of terminals which are connected by conductor 374 to the corresponding input lines of the diode symbol encoding board 250.

A further section 318 of the selection board 304 contains a plurality of terminals which are connected to the wipers of the various levels of the stepping switch SS1 to enable program selection to be made.

The remaining terminals of the selection board 304 are connected together in groups to supply buses which may be used to expand the capacity of the other sections as desired.

Provision of the different ones of the above mentioned sections of the selection board 304 makes possible a great degree of flexibility in programming the recording system. The manner in which the various sections of the selection board are inter-connected, and exert their controls in building up programs will be explained fully when the circuit diagram is described.

*Circuit diagram*

The circuits involved in coordinating the operations of the data input machine and the recorder are shown in Figs. 11A, 11B, 11C and 11D. In these figures, certain switches which are mere duplicates of others, such as the differentially controlled selector switches CR3a1 to CR7a1 have been omitted, as their operation is substantially the same as that of the one shown, and will be clear from the explanation of the operation of the ones which are shown.

In order that the explanation of the circuits will be more clear, they will be described as they function in preparing the apparatus for operation and in carrying out typical operations of the apparatus. In this explanation it will be assumed that the data input machine and the recorder have been previously operated through a complete transaction and are in "home" condition, ready to receive the entries of a new transaction.

Power is turned on by closing the main power switch MPS (Fig. 11A), which is located on the data input machine cabinet. The operation of the switch MPS closes a circuit to make the usual 110-volt, 60-cycle A.C. available to the data input machine motor 302 and, through the rectifier 201, to supply D.C. operating potential to the control circuits over conductors 350 and 351. A stabilizing capacitor 353 of 20 microfarads is connected across the conductors 350 and 351.

The application of operating potential to conductors 350 and 351 immediately causes the "operate" lamp 205 on the data input machine to light, to indicate that the operating potential is being supplied to the control circuits, putting the apparatus in condition for operation. The tape supply indicator light 163 on the data input machine will also light if the supply of tape is low and the arm 157 (Fig. 4) riding on the nearly depleted supply roll has closed contacts SC5a1 in the recorder.

The application of operating potential to conductors 350 and 351 also causes relay K3 to be energized immediately over relay contacts K1b12 and the normally closed contacts SP1bc1 of the leader advance push button PB1. The energization of relay K3 opens relay contacts K3bc1 to interrupt the circuit to the recorder motor 101 and closes relay contacts K3ac1 in the circuit to the trip solenoid L1 in the data input machine, so that the data input machine can be tripped for operation, if desired. Hence, at this time the data input machine is made ready, and the recorder is disabled.

The energization of relay K3 also closes contacts K3ac11 (Fig. 11B) in the "start record" circuit. Contacts K3bc11 open, but have no effect on the circuit at this time.

The preparation of the tape for use with most systems of auxiliary card punching equipment requires that a section, called "leader," be produced on each end of the tape. These sections are characterized either by multiple punching of a special leader advance or run-in code as shown in Fig. 2 or by the presence of the sprocket feed holes only. In either case it is necessary to connect a connector between two receptacles located in the recorder circuit. If only sprocket feed holes are to be punched, the connector is connected between receptacles 355 and 356 (Fig. 11B). If a special leader advance or run-in code is to be punched, the connector connects receptacle 357 (Fig. 11D) and receptacle 355. These receptacles may be conveniently located on the lower portion of the diode symbol encoding board 250.

Depressing the leader advance push button PB1 completes a circuit through contacts SP1ac1, which allows the run-in and step relay K2 to energize. This push button also opens contacts SP1bc1 to deenergize the register lock-up relay K3. The deenergization of relay K3 closes contacts K3bc1 to apply power to the recorder motor and opens contacts K3ac1 (Fig. 11A) to lock up the data input machine.

If only sprocket feed holes are to be punched in the leader advance or run-in portion of the tape, the energization of relay K2 and deenergization of relay K3 will complete a circuit from conductor 350 over contacts SS1bc21, K2ac1, receptacle 355, connector, receptacle 356, punch clutch magnet L9 and contacts SC1b1 to trip the clutch and cycle the punching mechanism to punch the sprocket feed holes.

Contacts SC1b1 in this circuit are safety contacts to prevent operation of the punching mechanism if conditions are such that proper punching cannot be obtained. These contacts will open to prevent the energization of the punch clutch magnet L9, if a bind in the tape pulls in the tension control lever 166 (Fig. 2), or if there is no paper tape under the tape feeler 167 (Fig. 2), or if the pressure plate lever 183 (Fig. 2) is not closed after the tape is inserted. The cycling of the punching mechanism to punch leader advance sprocket feed holes will continue so long as the leader advance push button is held depressed. Releasing this button will open the circuit described, and stop the operation.

Relay K2 closes contacts K2a3 in a holding circuit over contacts SC2b1, K1bc1 and SS1bc21 which will maintain the relay energized until the contacts SC2b1 open during a punching operation thus insuring that at least one leader advance punching will take place even if the push button is momentarily operated or is released before completion of a punching operation.

If a special leader advance code is to be punched and receptacle 355 is connected to receptacle 357 (Fig. 11D), the energization of relay K2 and deenergization of relay K3 completes a circuit to the punch clutch magnet L9 in a slightly different manner. The circuit extends from conductor 350, over contacts SS1bc21, K2ac1, receptacle 355, as before, but from here it continues through the connector between the receptacle 355 and the receptacle 357 to the uppermost input conductor of the diode symbol encoding board 250. Diodes are plugged into this board to connect this input conductor with the punch selecting magnets that will be used in punching the run-in code in this case, PS1 to PS6. The return circuit for the punch selecting magnets continues over contacts K2ad11 and safety contacts SC1b1 and will prevent the energization of the punch selecting magnets as well as the punch clutch magnet L9 if the conditions are such that proper punching cannot be had.

When the punch selecting magnets are energized, they select their associated punches for perforating the tape, and enable the punch selecting levers to close the contacts SC3a1. Closing contacts SC3a1 completes a circuit from conductor 350 to the punch clutch magnet L9 through contacts SS1bc21, K1bc1, SC2b1, and SC3a1. As magnet L9 energizes, it initiates a punching cycle, which causes the run-in code to be punched into the tape. Punching will continue as long as the leader advance push button PB1 is depressed.

When removing punched tape from the machine, some operators could conceivably follow the following procedure: They might tear the tape near the supply roll and then depress the leader advance button until the torn end of the tape runs far enough through the punch to cause the tape feeler 167 (Fig. 2) to drop and open the contacts SC1b1 to stop punch operation by deenergizing the punch clutch magnet L9. When the punch operation is completed in this manner it is possible that some of the punch selecting magnets may remain energized. If left energized over a period of time, the punch selecting magnets will overheat and burn out; therefore safeguards have been added to prevent this condition. These safeguards are the relay contacts K2ad11 and K2bd11.

During a leader advance operation, the run-in and step relay K2 is energized. This relay closes contacts K2ad11 and connects the punch selecting magnets to the conductor 351, through the contacts SC1b1. If the punched tape is removed from the machine as described in the previous paragraph, the opening of contacts SC1b1 will not only stop punch operation, but also will deenergize all of the punch selecting magnets. This, of course, presents damage due to the overheating of the punch selecting magnets. Contacts K2bd11, which are closed when the relay K2 is not energized, have been added to provide a path from the punch selecting magnets to the conductor 351 when recording is under the control of a media reader or some other apparatus which does not require relay K2 to be energized. This is necessary because, if the circuit were completed through contacts SC1b1, information from the apparatus might be lost if these tape interlock contacts were to open during a portion of the operating cycle of the apparatus.

As has been previously described, two diode encoding boards 250 and 251, mounted back to back on a bracket assembly 262, form the diode encoding unit 105a, each diode encoding board being constructed to form a matrix system, eight columns wide and ten rows high, with a socket at each junction suitable for the insertion of a diode. Encoding of digits and symbols is accomplished by merely inserting diodes into appropriate sockets on these boards. A diode plugged into one of these sockets completes an electrical circuit between the column and the row associated with the socket. Diodes are used in these circuits because of their characteristic of allowing current to flow in only one direction. Without diodes, back circuits would make it impossible to electrically isolate the different digit lines, symbol lines, and punch selecting magnets from each other unless, of course, a separate individual circuit were included throughout the recorder for each perforation required during a punching cycle. As has also been previously described, in addition to the matrix system, there is a row of seven taper pin receptacles 264 at the bottom of each board. These receptacles may be connected by connectors for special encoding when required.

A machine cycle of the data input machine is initiated by the machine operator. At a predetermined point in this cycle, after all selector switches, etc. have been properly positioned, a mechanism in the data input machine closes the start record switch contacts SC42a1 (Fig. 11B) to start recorder operation. Closing the contacts SC42a1 completes a circuit from the conductor 350 through contacts K3ac11, contacts SC42a1, and the conductor 315 to three terminals in section 314 (Fig. 11C) of the data input machine selection board 304, one of which terminals is connected by a plugboard connector to a terminal in the section which is connected to the wiper of one of the switches CRB1 to CRB3, such as the connector represented in Fig. 11C by the broken line 358 which connects conductor 315 to switch CRB1.

For purposes of illustration, let it be assumed that the No. 4 terminal, of the terminals of the row in section 312 of board 304 which are connected to the contacts of switch CRB1, has been connected by a plugboard connector, such as the conductor represented in Fig. 11C by the broken line 359, to a program I terminal in section 318 of board 304 to select the I punching program. The terminal in section 318 is in turn connected to the wiper of switch SSI, which is level I of the stepping switch. Also let it be assumed that the wiper of switch CRB1 has been differentially positioned to engage its #4 contact.

The above circuit, which has been traced to the wiper of switch CRB1, will then continue from the wiper of switch CRB1 through a conductor connected to its No. 4 contact to a corresponding terminal in section 312 of board 304; from there over the plugboard connector 359 to one of the program I terminals in section 318 of the board 304, and thence to the wiper of switch SSI. Since the wiper of switch SSI is positioned to engage terminal 360 at the beginning of a recording operation, the circuit will continue through terminal 360, conductor 214, and contacts K1bd11 to the operate relay K1.

It will be seen that the above illustration is only one example of the possible programming of the recording system. If desired, plugboard connections may be made from a terminal in section 312 corresponding to a contact on one of the switches CRB1 to CRB3, to a terminal in section 314 connected to the wiper of a second switch CRB1 to CRB3. A terminal in section 312 of the same switch as said terminal in section 314 may then be connected to a third wiper terminal in section 314. A program may thus be set up which is jointly controlled by the positions of the wipers of two or more of the control switches CRB1 to CRB3, and in which all of the switches must be in predetermined positions for the desired operation to take place.

An example of such programming is shown in Fig. 11C, where a plugboard connector 361 is connected between a terminal associated with contact 3 of switch CRB1 and a terminal associated with the wiper of switch CRB2. A second plugboard connector 362 is connected between a terminal associated with contact 1 of switch CRB2 and a terminal associated with the wiper of switch CRB3. A third plugboard connector 363 is connected between a terminal associated with contact 7 of the switch CRB3 and a terminal in section 318 of the board 304 which is associated with the wiper of level II of the stepping switch 206. Thus, when the data input machine is operated with the program selector switches CRB1, CRB2 and CRB3, in positions 3, 1 and 7 respectively, program II will be selected.

When the three program selector switches are used to select the program, the terminals in section 306 and 308 of board 304, which control punching of symbols representing the various control positions, would similarly be connected by plugboard connectors to correspond with the arrangement in sections 312 and 314, a further connection being made between the terminal associated with contact 7 of switch CRA3 and a terminal in one of the digit and symbol sections 305, 310 or 316 of the board 304 to cause an appropriate digit or symbol to be punched.

It will also be seen that at the same time other terminals in section 312 associated with program selector switch CRB1 may be connected to terminals in section 318 so that certain differential positioning of the switches CRB1 will be effective to cause a desired one of the programmed recording operations to take place.

The programming of the recording system is thus very flexible and may be set up to meet the requirements of a great variety of different types of recording operations.

The previously mentioned circuit through operate relay K1 energized said relay with the following results:

Contacts K1ad11 close to provide a holding circuit for relay K1 through contacts K2b12 to the conductor 350.

Contacts K1b12 open to deenergize the register lockup relay K3. This prevents another operation of the data input machine until the data set up in the machine is recorded. However, information may be indexed on the keyboard of the data input machine at this time in preparation for the next machine operation. The opening of contacts K1b12 also prevents a leader advance operation by interrupting the circuit to the leader advance contacts SP1ac1.

Contacts K1bc2 open to interrupt the circuit over K2bc2 which is used in reset operations but not in this operation.

Contacts K1bc1 open to interrupt the holding circuit for relay K2 which was effective in leader advance operations and also interrupt the circuit to the receptacle 355 from contacts SS1ac21 when the stepping switch 206 is out of "home" position and relay K2 energizes. Voltage reaching the receptacle 355 would cause punching of unwanted leader advance symbols.

Contacts K1ac2 close, completing a circuit from conductor 350 to the stepping switch magnet SS1 over contacts SS1bc21, K2bc1, K1ac2, and SS1b11. When the magnet SS1 energizes, it cocks a wiper driving spring of the stepping switch 206 and opens contacts SS1b11. As contacts SS1b11 open, they cause magnet SS1 to deenergize. This action releases the wiper driving spring, advancing the stepping switch wipers to their first position.

Contacts K1ac1 and K1a3 close in an energizing circuit to relay K2 which extends from conductor 350, through contacts SS1ac21, K1ac1, SC2b1, SS1b1 and K1a3. When the stepping switch wiper has moved from home position, contacts SS1ac21 close to apply voltage to the relay K2 through contacts K1ac1, SC2b1, SS1b1 and K1a3. Relay K2 is then held energized by its own holding contacts K2a3 which parallel contacts K1a3 and SS1b1.

Contacts K2ac2 close to complete a circuit from conductor 350 to stepping switch magnet SS1 to energize said magnet.

The energization of the stepping switch magnet closes contacts SS1a3 to complete a circuit over contacts SS1ac21, K2ac2, SS1a3 and conductor 315 to the terminals in section 314 of the selection board 304 and through the program selector switch to the wiper of level SS1 of the stepping switch as previously described.

The apparatus is now ready to record data as required by position #1 of punching program I, which data may be fixed data which is the same in all recording under control of program I or variable data which may be set up in the data input machine and may vary in different recording operations using program I.

The stepping switch magnet SS1 will remain energized until a punching operation takes place which opens contacts SC2b1 in the holding circuit for relay K2.

Accordingly, with the stepping switch advanced to position #1 and with the stepping switch magnet energized to apply potential to the wiper of level I as explained, the circuit will be continued over position #1 contact to a punch selecting magnet.

Assuming that the first three punching operations of program I will be utilized to record fixed data in the form of a three-digit identification number, then position #1 terminal for program I in the upper program board 215 would be connected by a plugboard connector to the required digit terminal in section 221 of the lower program board 208 and thence to the corresponding digit input conductor in the digit encoding board 251. This digit input conductor would have been connected by diodes to the required punch selecting magnets according to the code for the digit and the circuit would cause these magnets to be energized to select their related punches for operations and initiate an operation of the punching mechanism to punch this digit in the tape.

During the punching of this digit in the tape, contacts SC2b1 open to deenergize relay K2 which in turn opens contacts K2ac2 to deenergize the stepping switch magnet SS1 and advance the wipers to position #2. The deenergization of the stepping switch magnet SS1 opened contacts SS1a3 to interrupt the circuit over the stepping switch wiper as the wiper advanced from position #1 to position #2; hence arcing between the wiper and its related contacts during the movement from contact to contact is eliminated.

At 185 degrees in the punching cycle, contacts SC2b1 reclose to reenergize relay K2, thereby closing the contacts K2ac2 to reenergize the stepping switch magnet SS1 which in turn closes contacts SS1a3 to complete the circuit over the stepping switch wiper for level I and position #2 of the stepping switch. Position #2 terminal for program I in the upper program board 215 will be similarly connected by a plugboard connector to one of the digit terminals in section 221 of the lower program board 208 and, through the digit encoding board 251, would cause the required punch selecting magnets to be energized to cause an operation of the punching mechanism to punch the second digit of the identification number.

During the punching of the second digit, contacts SC2b1 again open to deenergize relay K2 and the stepping switch magnet to advance the wipers to position #3, and at 185° of the punching cycle contacts SC2b1 reclose to reenergize relay K2, thereby closing the contacts K2ac2 to reenergize the stepping switch magnet which closes contacts SS1a3 to complete the circuit over the #3 terminal for program I in the upper program board 215 and over a plugboard connector to a terminal in section 221 to the punch selecting magnets via the digit encoding board to punch the third digit of the identification number. During the punching of the third digit, the wipers move to the #4 position.

Assume that the fourth punching operation in program I will be to punch a fixed symbol, an end of frame symbol for example. During the setting up of the circuits to make up program I, a plugboard connector, represented in Fig. 11D by the broken line 365, would have been connected from the #4 terminal for program I in the upper program board 215 to a symbol #1 terminal 366 in the special symbol section 220 of the lower program board 208. Also, two diodes 367 and 368 would have been inserted in the symbol line #1 on the diode symbol encoding board 250, diode 367 making an electrical connection to punch selecting magnet PS7 and diode 368 making an electrical connection to punch selecting magnet PS8.

Now, as the wipers of the stepping switch 206 reach position #4, and contacts SS1a3 close, the circuit is completed to the #4 terminal of program I on the upper program board 215. From here, the circuit continues via the plugboard connector 365 through the terminal 366 in section 220 of board 208, through symbol line #1 on the diode symbol encoding board 250, through the diodes 367 and 368, to the punch selecting magnets PS7 and PS8. As magnets PS7 and PS8 energize, they trip their related punch selecting levers, causing the contacts SC3a1 to close and thus initiating a punching cycle. During this punching cycle, holes will be punched in tape channels 7 and 8 to record an end-of-frame symbol, and the stepping switch wiper will be advanced to its #5 position.

The manner in which the recording of variable data is accomplished under control of the data input machine will now be explained.

The circuit for recording variable data under control of the data input machine is similar to the circuit for recording fixed data up to the point where the plugboard connectors connect the various positions of the stepping switch to the data selecting means. In the case of the variable data recording operations, the plugboard connectors connect the terminals for the various positions of the stepping switch to the wipers of the required ones of the switches CR1a1 to CR9a1 and CRA1 to CRA3 in the required sequence to read out the data according to the setting of the switches.

Suppose, for example, that it is desired that information from switch CR8a1 of the data input machine is to be recorded from the #5 position in program I. When program I is being set up in the recorder, a plugboard connector, represented in Fig. 11D by the broken line 369, must be connected between the #5 terminal of program I in upper program board 215 and a readout terminal 370 for row 8 in the readout section 219 of the lower program board 208. The terminal 370 is connected to a conductor in a cable 371, which conductor in turn is connected to the wiper of the digit selector switch CR8a1 which is set according to data entered in row 8 of the input machine.

Assuming, as an illustration, that the #3 key in row 8 were depressed, then in an operation of the data input machine, the digit selector switch CR8a1 would be mechanically positioned with its wiper on the #3 contact.

As shown in Fig. 11C, corresponding digit contacts of each selector switch CR1a1 to CR9a1 are connected together by a conductor in a cable 372 which extends to the corresponding digit lines on the diode digit encoding board 251. With switch CR8a1 set to the #3 position, the wiper arm of the selector switch CR8a1 will complete a circuit from the #5 terminal of program I, over connector 369, terminal 370, the proper conductor in cable 371, selector switch CR8a1, and the "3" conductor in cable 372, to the #3 input digit line of the diode digit encoding board 251. If the code shown in Fig. 12 was being used, diodes would be plugged in between the #3 input digit line and the punch selecting magnets PS1 and PS2 on board 251, as is shown in Fig. 11D. Voltage applied to these magnets would cause their related punches to be selected and would initiate a cycle, causing the digit "3" to be recorded by punching holes in tape channels 1 and 2. During the recording of the digit "3," the stepping switch would be advanced to the #6 position.

It is to be noted that the circuit to the wiper of a selector switch, such as CR8a1, can be switched to any of the digit conductors in cable 372 depending on the particular setting of the switch and this enables variable data to be punched under control of the data input machine.

In a similar manner, the terminals for the remaining steps of program I can be connected by plugboard connectors to other selector switches or sources of fixed data as required.

As explained earlier, three program selector switches CRB1 to CRB3 are shown and can be used singly or in combination to select a punching program. Each of these selector switches has a punch selector counterpart, switches CRA1 to CRA3, which is set to an identical position therewith and can be utilized to control the punching of a symbol or digit to indicate the significance of the data being punched. The contacts of these punch selector switches are connected to rows of terminals in section 306 of the selection board 304 and can be connected by plugboard connectors to terminals in a digit section 305 which are connected to corresponding digit conductors in cable 372, or can be connected to terminals in symbol sections 310 and 316 which are connected over conductors in cables 373 and 374 to input conductors of the diode symbol encoding board 250.

Accordingly if one program selector switch is used to select the program, its related punch selector switch can have its wiper connected by a plugboard connector to one of the terminals in the upper program board 215 and can have its terminals in section 308 connected by plugboard connectors to terminals in section 305, 310 or 316 to cause any desired digits or symbols to be punched for the various positions of the switch.

For purposes of illustration, let it be assumed that in section 306 of board 304 the #2 terminal related to switch CRA3 is connected by a plugboard connector, represented in Fig. 11C by the broken line 375, to a terminal 376 in the section 310 of the board 304. Then, with the wiper of control punch selector switch CRA3 positioned to its #2 contact, a circuit to the wiper from a stepping switch terminal over a conductor in cable 371, is switched by the switch CRA3 to the #2 terminal in section 310, then over the plugboard connector 375, the terminal 376, the conductor in cable 373, input symbol line #3 on the diode symbol encoding board 250, and the diode 377, to the punch selecting magnet PS8. Voltage applied to this magnet would initiate a punch cycle, causing a symbol represented by a hole in tape channel 8 to be recorded.

If two or more of the switches CRA1, CRA2 and CRA3 are to be used to control the punching of data, the wiper of one of the switches will be connected by a plugboard connector to one of the program terminals in the upper program board 215 and the output from the switch connected to the wiper of another switch.

For example, consider how the switches as set in Fig. 11C can be used to control the selection of punches. A plugboard connector 390 would connect a terminal in the upper program board 215 to terminal 391 in section 219 of lower portion 208, which terminal is connected to the wiper of switch CRA1. A terminal 396 in section 306 of the selection board 304 which is connected to the third contact of switch CRA1 will be connected by a plugboard connector 392 to a terminal 393 which is connected to the wiper of switch CRA2. Similarly a terminal 397 in section 306 which is connected to the first contact of CRA2 would be connected by a plugboard connector 394 to a terminal 395 which is connected to the wiper of switch CRA3. The terminal 398 in section 306 which is connected to the seventh contact of switch CRA3 would be connected by a plugboard connector to one of the terminals in sections 305, 310 or 316. This circuit through the three switches will be completed only when all three switches have been set to these positions and will in such case cause the required digit or symbol to be punched.

After recording all of the information included in one program, it is necessary to cause the wipers of the stepping switch 206 to return to their "home" position. The programming necessary to accomplish this requires one plugboard connector for each program, which connects the reset terminals 224 to the terminals immediately following the terminals used to control the recording of the last data in each program. An example of one such plug board connector is represented in Fig. 11D by the broken line 378 which connects one of the reset terminals 224 to a terminal 379 in program IV, in the upper program board 215. The terminal 379 will be considered to be the one immediately following the position of the last recorded data in program IV.

When the wiper of level IV of stepping switch 206 is stepped to a contact connected to terminal 379, a circuit is completed through level IV of the stepping switch, terminal 379, connector 378, reset terminal 224, and a conductor 380 connecting the reset terminal to the lockup relay K3 over contacts K2a13. If relay K2 is energized, this circuit will cause relay K3 to be energized. As relay K3 energizes, it opens contacts K3bc11 to deenergize operate relay K1, since contacts K2b12 are open at this time. Contacts K1ac1 are thus opened, opening the circuit to the run in and step relay K2 and the punch clutch magnet L9. Contacts K1bc2 close, completing a circuit through contacts SS1ac21, K2bc2, K1bc2 and SS1b11 to the stepping switch magnet SS1. As the magnet SS1 energized, self interrupter contacts SS1b11 open, causing the magnet SS1 to deenergize and advance its wipers one position. As the magnet SS1 deenergizes, contacts SS1b11 reclose, causing the magnet SS1 to be energized again.

This resetting operation continues until the stepping switch wipers reach their "home" position. At this point, contacts SS1ac21 open the resetting circuit over contacts K2bc2, K1bc2 and SS1b11 to the stepping switch magnet SS1. In "home" position of the stepping switch, contacts SS1bc21 close. The system has now recorded all of the information required in one program. It is now ready to repeat this program, or to record information from any of the other programs which have been set up.

While the form of the invention shown and described herein is admirably adapted to fulfill the objects primarily stated, it is to be understood that it is not intended to confine the invention to the form or embodiment disclosed herein, for it is susceptible of embodiment in various other forms.

What is claimed is:

1. In an apparatus of the class described, the combination of a plurality of switching means, each having a plurality of contacts and a wiper which is differentially settable according to the data to be punched, each setting of the switching means being capable of representing data of different significance; a first set of conductors, each conductor in the first set being connected to corresponding contacts of each of the switching means; a plurality of punch selecting means; a second set of conductors, each conductor in the second set being connected to one of the punch selecting means; an encoding board, the first set of conductors having terminal portions positioned in parallel relationship to each other in the board, the second set of conductors having terminal portions positioned in parallel relationship to each other in the board, and positioned at right angles to and spaced from the terminal portions of the first set of conductors; a plurality of sockets in the board, a socket being located at each point in the board where a terminal portion of one of the sets of conductors crosses over a terminal portion of one of the other set of conductors; and a diode connector positioned in each socket where it is desired to connect a terminal portion of one of the first set of conductors to a terminal portion of one of the second set of conductors for control of the punch selector means by the switching means according to any desired encoding system, the diode connectors providing unidirectional conducting means to eliminate the possibility of back circuits which might otherwise cause erroneous punch selection.

2. In an apparatus of the class described, the combination of a plurality of switching means, each having a plurality of contacts and a wiper which is differentially settable according to the data to be punched, each setting of the switching means being capable of representing data of different significance; a first set of conductors, each conductor in the first set being connected to corresponding contacts of each of the switching means; a plurality of output connections; a second set of conductors, each conductor in the second set being connected to one of the output connections; an encoding board; a plurality of parallel longitudinal members positioned in the board, each having a plurality of cup-shaped socket formations therein and each being connected to one of the second set of conductors; a plurality of parallel transverse members having a U-shaped cross sectional configuration positioned in the board, being spaced from and crossing under the longitudinal members, and each being connected to one of the first set of conductors; and a diode connector having a cylindrical body portion and a rod-like end portion, being positioned in each socket formation of the longitudinal members where it is desired to provide an electrical connection between a longitudinal member and a transverse member, the cylindrical body portion of the diode connector being retained in a cup-shaped formation of the longitudinal member and the rod-like end portion of the diode connector being retained between the legs of the U formed by the transverse member whereby any one or more of the output connections may be selectively connected to any one or more of the switching means according to any pre-arranged system, the diode connectors providing unidirectional conducting means to eliminate the possibility of undesired back circuits.

3. In an apparatus of the class described, the combination of a stepping switch having a plurality of contacts and at least one wiper; magnetically operated stepping means for stepping the wiper from a "home" position to successive contacts on the stepping switch; a first set of contacts controlled by the stepping switch to be open when the wiper is in the "home" position and otherwise closed; a second set of contacts controlled by the wiper to be closed when the wiper is in "home" position and otherwise open; recording means for recording data on record material; a third set of contacts for controlling the stepping means, the stepping means and the first and third sets of contacts being included in a circuit; a fourth set of contacts for controlling the recording means, the recording means and the second and fourth sets of contacts being included in a circuit; and a relay operable to close both the third and fourth sets of contacts when it is energized, whereby energization of the relay when the wiper of the stepping switch is in "home" position will render the recording means operable to record predetermined data in response to an operator's signal, while energization of the relay when the wiper of the stepping switch is in a position removed from "home" position will energize the stepping means to cause the stepping switch to be stepped.

4. In an apparatus of the class described, the combination of a stepping switch having a plurality of contacts and at least one wiper; magnetically operated stepping means for stepping the wiper from a "home" position to successive contacts on the stepping switch; a first set of contacts controlled by the stepping switch to be open when the wiper is in "home" position and otherwise closed; a second set of contacts controlled by the wiper to be closed when the wiper is in "home" position and otherwise open; recording means for recording data on record material; a relay for controlling the stepping of the switch under control of the recorder when the first set of contacts is closed and for controlling the recorder to record predetermined data without stepping the switch when the second set of contacts is closed; a relay energizing circuit completed over said first set of contacts, when closed, said circuit including recorder-controlled contacts opened in each operation of the recorder to momentarily deenergize the relay; a circuit including said first set of contacts and contacts closed by the operated relay for energizing the stepping switch magnet, the momentary deenergization of the relay under control of the recorder causing the interruption of the circuit to the magnet thereby to advance the stepping switch as recording progresses; means for energizing the relay to cause the recording of predetermined data; and a circuit including the second set of contacts and further relay contacts, which are closed by the operated relay, to cause the recorder to operate to record data without stepping the stepping switch.

5. In an apparatus for the recording of data, the combination comprising a plurality of data-representing means; a first set of conductors, each conductor in said set being connected to a corresponding data-representing means; a plurality of punch-selecting means for selecting punches for operation to record data in accordance with a predetermined code; a second set of conductors, each conductor in the second set being connected to one of the punch-selecting means; an encoding member in which the two sets of conductors terminate in coordinate juxtaposed relationship to each other; and unidirectional conducting means selectively positioned on the encoding member to interchangeably interconnect the two sets of conductors for control of the punch-selecting means by the data-representing means according to any desired encoding system, the unidirectional conducting means eliminating the possibility of back circuits which might otherwise cause erroneous punch selection, and being shiftable from one connecting position to another to change the encoding system.

6. In an apparatus for the recording of data, the combination of data-representing means; a first set of conductors, each conductor in the first set being connected to a corresponding data-representing means; a plurality of punch-selecting means; a second set of conductors, each conductor in the second set being connected to one of the punch-selecting means; an encoding board, the first set of conductors having terminal portions positioned in parallel relationship to each other in the board, the second set of conductors having terminal portions positioned in parallel relationship to each other in the board, and positioned substantially at right angles to and spaced from the terminal portions of the first set of conductors; a plurality of sockets in the board, a socket being located at each point in the board where a terminal portion of one of the sets of conductors crosses over a terminal portion of one of the other set of conductors; and a diode connector positioned in each socket where it is desired to connect a terminal portion of one of the first set of conductors to a terminal portion of one of the second set of conductors for control of the punch selector means by the data-representing means according to any desired encoding system, the diode connectors providing unidirectional conducting means to eliminate the possibility of back circuits which might otherwise cause erroneous punch selection.

References Cited in the file of this patent

UNITED STATES PATENTS

| | | |
|---|---|---|
| 2,428,811 | Rajchman | Oct. 14, 1947 |
| 2,540,027 | Dodge | Jan. 30, 1951 |
| 2,693,593 | Crosman | Nov. 2, 1954 |
| 2,702,879 | Wheeler | Feb. 22, 1955 |
| 2,703,617 | Maul | Mar. 8, 1955 |
| 2,737,241 | Doty | Mar. 6, 1956 |
| 2,738,499 | Sprick | Mar. 13, 1956 |